(12) United States Patent
Sutaria et al.

(10) Patent No.: US 12,539,258 B2
(45) Date of Patent: Feb. 3, 2026

(54) METHODS AND APPARATUS FOR ACCESSING AND MONITORING THE GASTROINTESTINAL TRACT

(71) Applicant: Gravitas Medical, Inc., San Francisco, CA (US)

(72) Inventors: Saheel Sutaria, El Cerrito, CA (US); Daniel R. Burnett, San Francisco, CA (US); Michael Baycura, San Francisco, CA (US); David Thompson, Dana Point, CA (US); Arthur Spivy, Vienna, VA (US); Elliott Bennett-Guerrero, Setauket, NY (US); Sam Radochonski, San Francisco, CA (US); Nicholas Mercer, San Francisco, CA (US)

(73) Assignee: Gravitas Medical, Inc., Berkeley, CA (US)

( * ) Notice: Subject to any disclaimer, the term of this patent is extended or adjusted under 35 U.S.C. 154(b) by 606 days.

(21) Appl. No.: 17/192,079

(22) Filed: Mar. 4, 2021

(65) Prior Publication Data
US 2022/0304898 A1     Sep. 29, 2022

Related U.S. Application Data

(63) Continuation of application No. PCT/US2019/053217, filed on Sep. 26, 2019.
(Continued)

(51) Int. Cl.
*A61J 15/00*     (2006.01)
*A61B 5/00*     (2006.01)
(Continued)

(52) U.S. Cl.
CPC .............. *A61J 15/0084* (2015.05); *A61B 5/01* (2013.01); *A61B 5/068* (2013.01);
(Continued)

(58) Field of Classification Search
CPC ..... A61J 15/0084; A61J 15/0003; A61B 5/01; A61B 5/068; A61B 5/4238; A61B 5/6847;
(Continued)

(56) References Cited

U.S. PATENT DOCUMENTS 4,420,001 A * 12/1983 Hearne ................ A61B 5/0816
600/537
8,100,800 B2     1/2012 Foster
(Continued)

FOREIGN PATENT DOCUMENTS

JP     2012-500700     1/2012
JP     2013-521040     3/2014
(Continued)

*Primary Examiner* — Bradley J Osinski
(74) *Attorney, Agent, or Firm* — Levine Bagade Han LLP

(57) ABSTRACT

Methods and apparatus for accessing and monitoring the gastrointestinal tract are described herein. One variation of a feeding tube system may generally comprise a gastric access device having a length, a controller in communication with the gastric access device, and one or more impedance or conductivity sensors positioned along the length and one or more temperature sensors positioned along the length. The controller may be configured to receive a first signal associated with the impedance or conductivity sensors and a second signal associated with respiration and determine whether a placement of the gastric access device is within a stomach of the subject.

49 Claims, 26 Drawing Sheets

Related U.S. Application Data

(60) Provisional application No. 62/736,951, filed on Sep. 26, 2018, provisional application No. 62/877,738, filed on Jul. 23, 2019.

(51) Int. Cl.
| | |
|---|---|
| *A61B 5/01* | (2006.01) |
| *A61B 5/03* | (2006.01) |
| *A61B 5/06* | (2006.01) |
| *A61B 5/145* | (2006.01) |
| *A61B 5/285* | (2021.01) |

(52) U.S. Cl.
CPC ........ *A61B 5/14539* (2013.01); *A61B 5/4238* (2013.01); *A61B 5/6847* (2013.01); *A61B 5/03* (2013.01); *A61B 5/285* (2021.01); *A61B 5/4836* (2013.01); *A61B 5/7264* (2013.01); *A61B 2560/0252* (2013.01)

(58) Field of Classification Search
CPC .... A61B 5/03; A61B 5/285; A61B 2560/0252
See application file for complete search history.

(56) References Cited

U.S. PATENT DOCUMENTS

| | | |
|---|---|---|
| 8,480,648 B2 | 7/2013 | Burnett et al. |
| 8,613,702 B2 | 12/2013 | Feer et al. |
| 9,532,739 B2 | 1/2017 | Bennett-Guerrero |
| 11,800,992 B2 | 10/2023 | Burnett et al. |
| 2003/0130711 A1* | 7/2003 | Pearson ............. A61B 18/1477 607/101 |
| 2013/0296984 A1 | 11/2013 | Burnett et al. |
| 2016/0151248 A1 | 6/2016 | Elia et al. |
| 2016/0331298 A1 | 11/2016 | Burnett et al. |
| 2017/0020724 A1 | 1/2017 | Burnett et al. |
| 2017/0071502 A1 | 3/2017 | Bennett-Guerrero |
| 2018/0078195 A1 | 3/2018 | Sutaria et al. |
| 2024/0008763 A1 | 1/2024 | Burnett et al. |

FOREIGN PATENT DOCUMENTS

| | | |
|---|---|---|
| JP | 2017-503557 | 2/2018 |
| JP | 2018-524042 | 8/2018 |
| WO | WO 2014/105759 | 7/2014 |
| WO | WO 2016/187456 | 11/2016 |
| WO | WO 2018/104888 | 6/2018 |
| WO | WO 2020/069171 | 4/2020 |

* cited by examiner

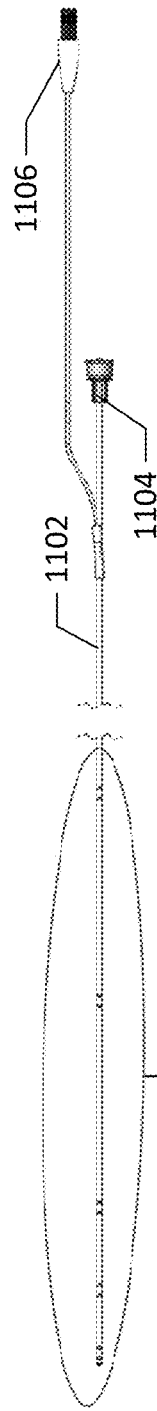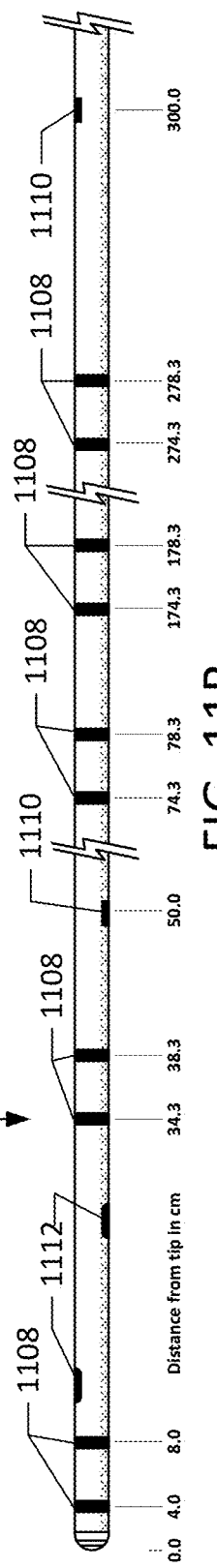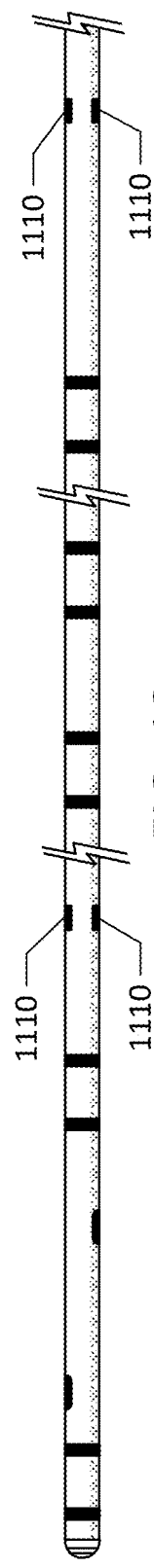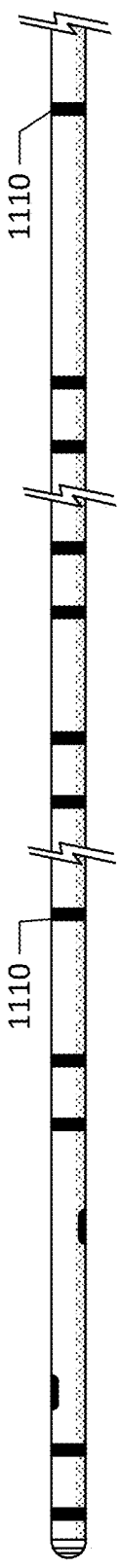

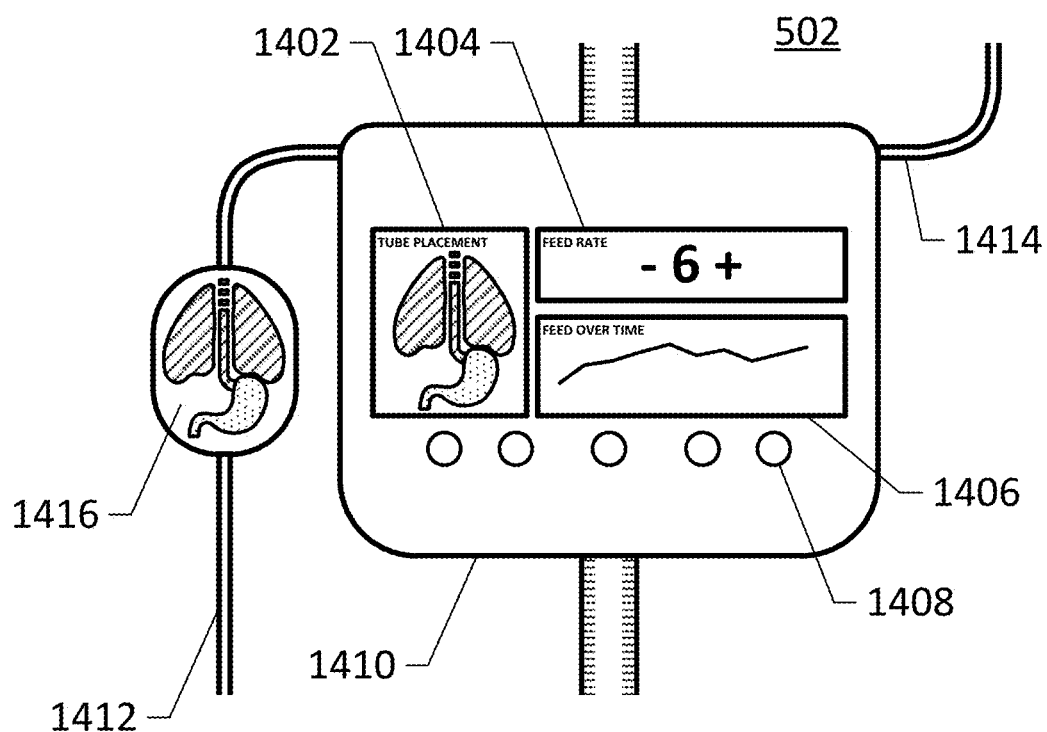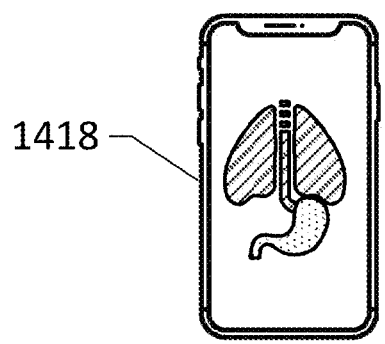
FIG. 14

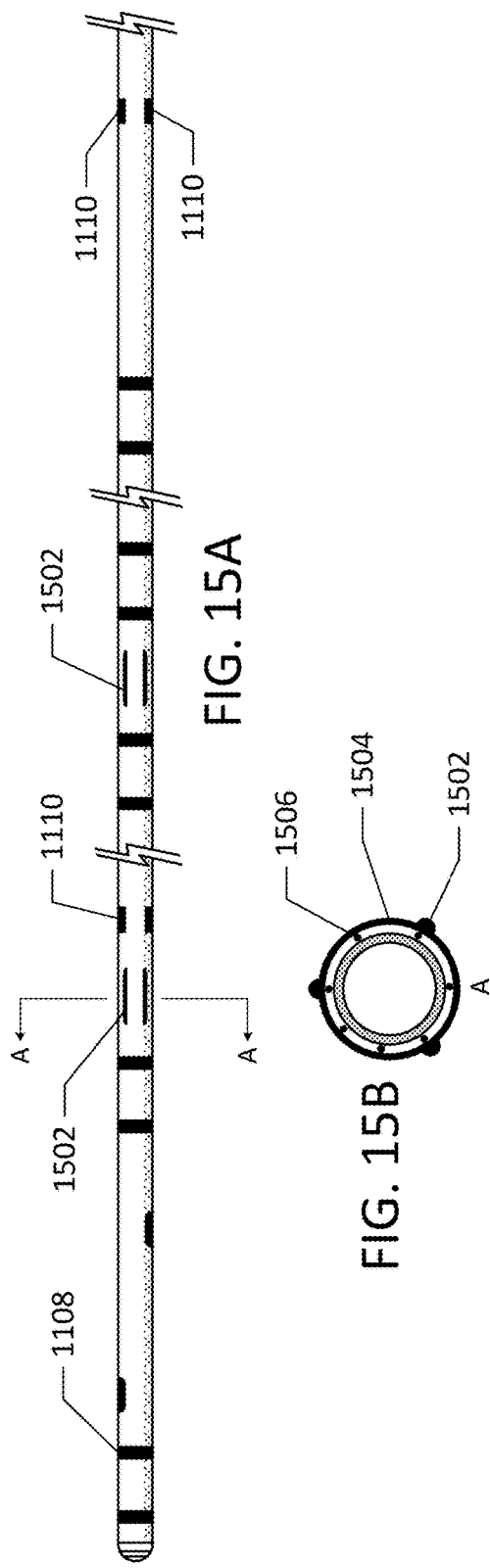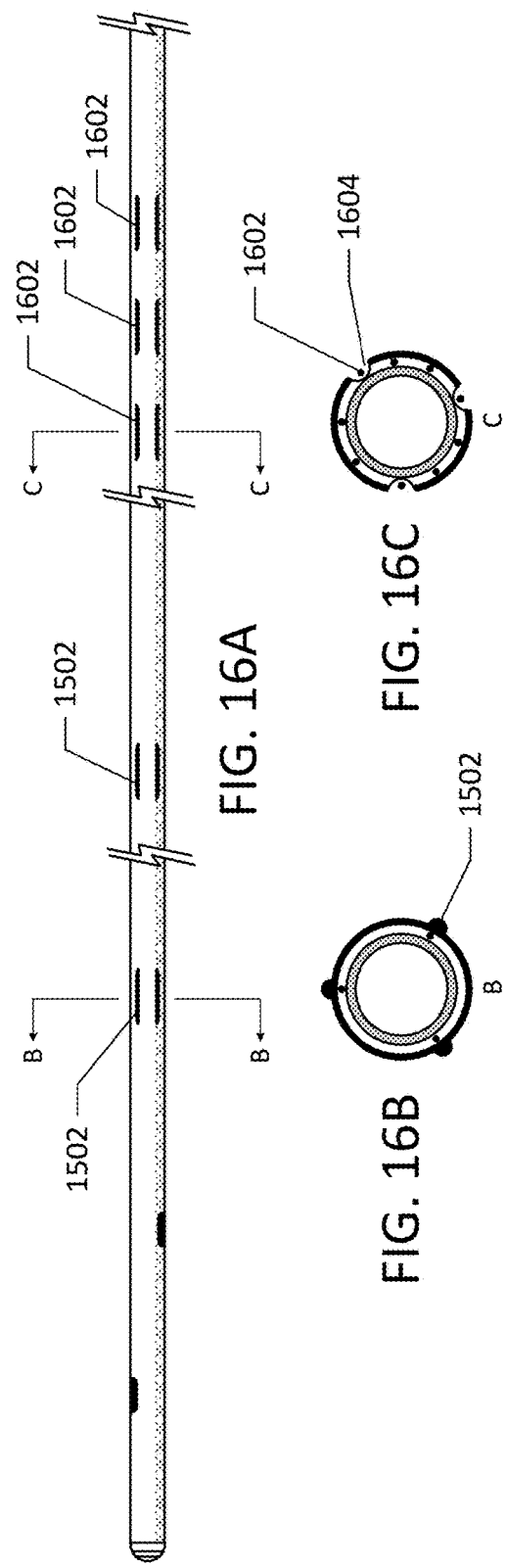

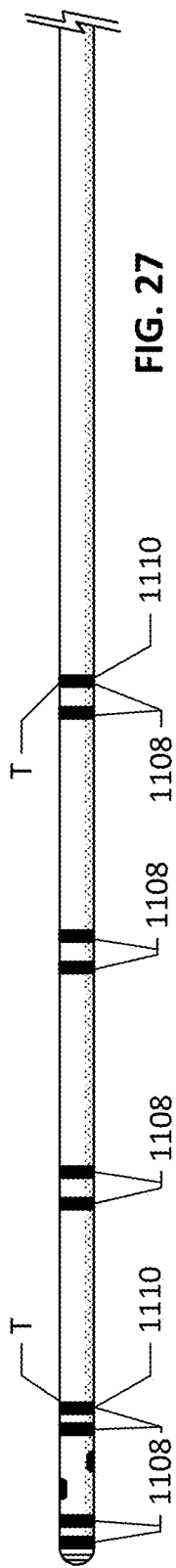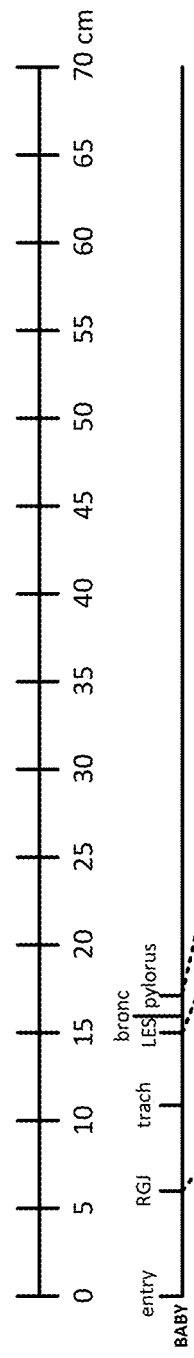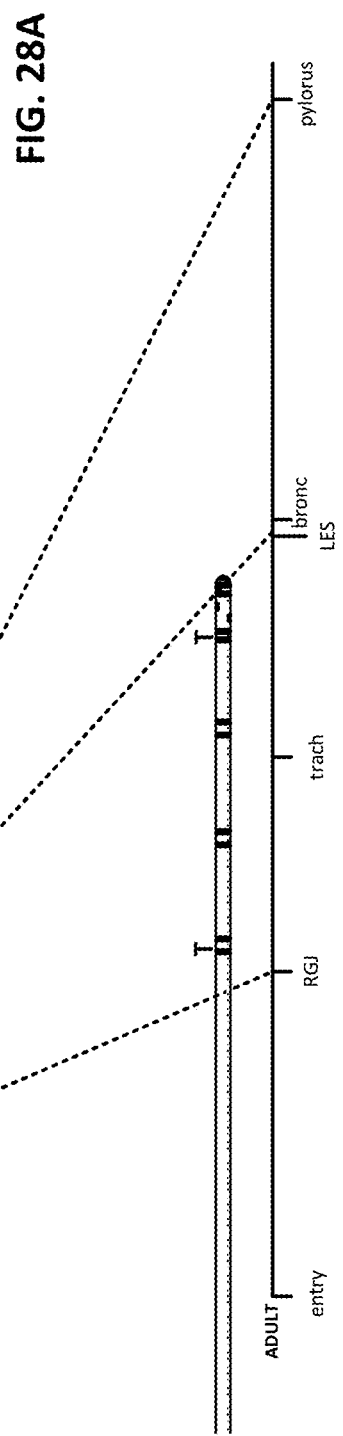
FIG. 27
FIG. 28A

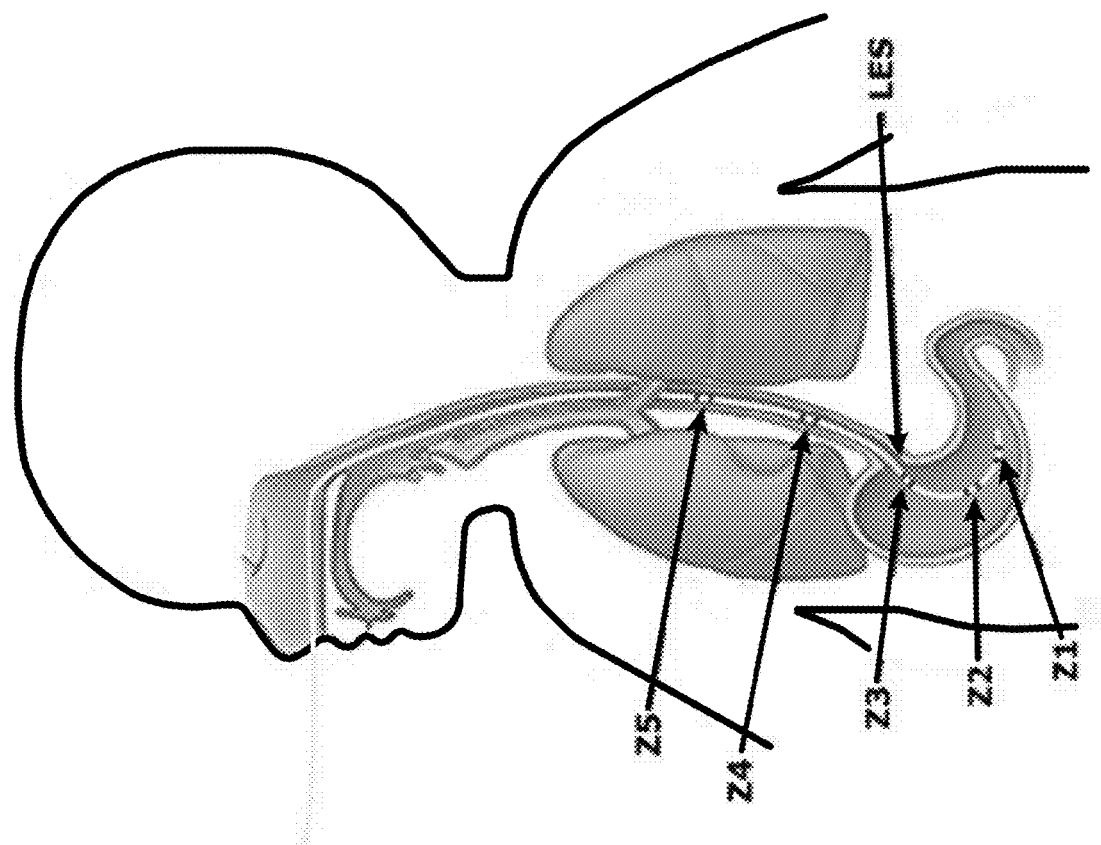
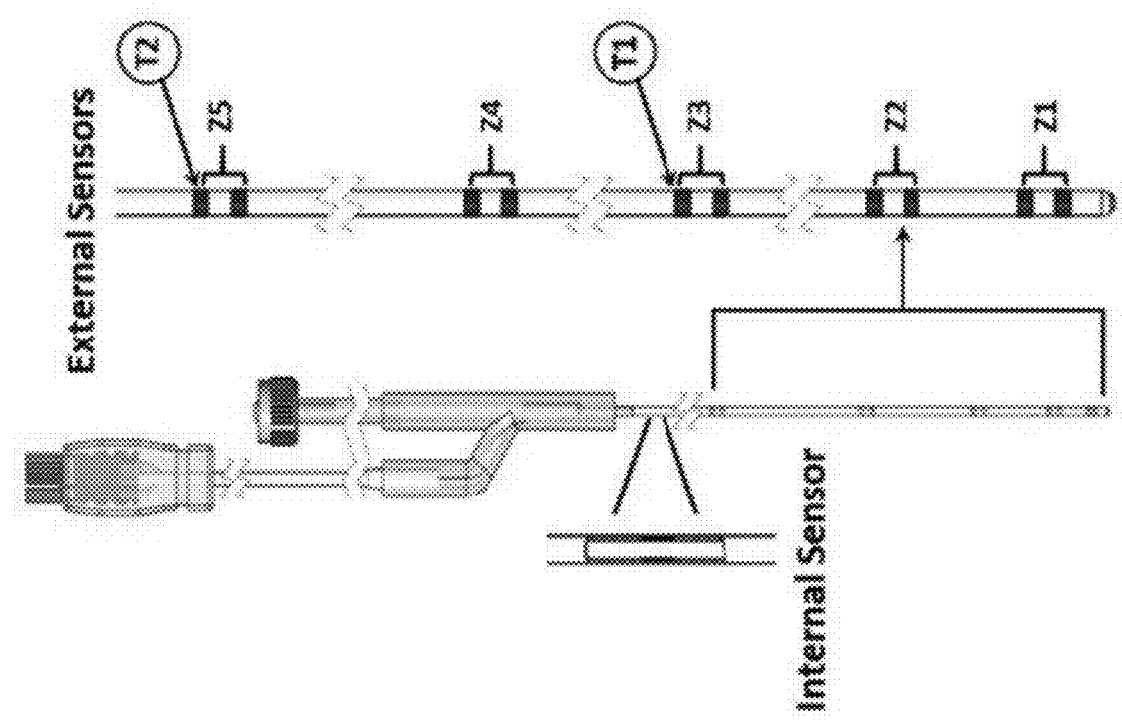
FIG. 28B

METHODS AND APPARATUS FOR ACCESSING AND MONITORING THE GASTROINTESTINAL TRACT

CROSS-REFERENCE TO RELATED APPLICATIONS

This application is a continuation of International Patent Application No PCT/US2019/053217 filed Sep. 26, 2019, which claims the benefit of priority to U.S. Provisional Application No. 62/736,951 filed Sep. 26, 2018, and U.S. Provisional Application No. 62/877,738 filed Jul. 23, 2019, each of which is incorporated herein by reference in its entirety.

FIELD OF THE INVENTION

The present invention relates to feeding tube placement/monitoring, as well as the measuring of gastric volume, gastric emptying, and detection and management of gastric reflux.

INCORPORATION BY REFERENCE

All publications and patent applications mentioned in this specification are herein incorporated by reference to the same extent as if each such individual publication or patent application were specifically and individually indicated to be so incorporated by reference.

BACKGROUND OF THE INVENTION

Enteral feeding through a feeding tube allows patients to receive nutrition when he/she cannot receive nutrition through the mouth, cannot swallow safely or to provide supplemental nutrition.

Placing a gastric tube (naso- or oro-gastric, herein also referred to as NG tube, or feeding tube) also has its challenges. An NG tube may be inadvertently placed in the trachea rather than the esophagus, resulting in complications or even death. A solution is also needed to accurately place the NG tube in the gastrointestinal tract (i.e., the esophagus, stomach or intestines), and not in the trachea or the lungs.

Tracking the feeding status of the patient is also important, so that the patient is not underfed or overfed. Note that the term "GRID" used herein may refer to Gastric Residual Volume or gastric emptying or gastric residual feed or gastric motility or gastric status.

Preventing, identifying, and managing gastric reflux is also important during enteral feeding, as reflux can be introduced into the lungs, causing serious medical complications.

SUMMARY OF THE INVENTION

Embodiments of a gastric access device are disclosed herein which improve the ability to confidently access the GI tract and avoid inadvertent entry into the trachea/lungs of a patient. Embodiments include one or more sensor types to determine whether the device is in the GI tract or the trachea/lungs. Some sensor types positively ID the GI tract, such as impedance/conductivity sensors, pH sensors, ECG (electrocardiography) sensors, pressure sensors etc. Some sensor types positively ID the trachea/lungs such as temperature sensors, humidity sensors, $O_2$ sensors, $CO_2$ sensors, flow sensors, acoustic sensors, pressure sensors etc. Some of these sensors may ID both. A combination of sensors, at least one of which positively IDs the GI tract, and at least one of which positively IDs the trachea/lungs, may be used to properly locate the device in the GI tract (or the trachea/lungs). Alternatively, 2 different sensor types which positively ID the GI tract may be used to properly locate the device. Alternatively, 2 different sensor types which positively ID the trachea/lungs may be used to properly locate the device.

In some embodiments, only one sensor type is needed to properly locate the device. In some embodiments, 2 sensor types are available to properly locate the device. In some embodiments, 3 sensor types are available to properly locate the device. All sensor types available may not be used on every patient in every environment.

One or more of any sensor type may be used along the length of the gastric access device. In some embodiments, more than one sensor is placed on or along the gastric access device so that at least one sensor will be in a functional location. For example, more than one temperature sensor may be along the gastric access device so that at least one temperature sensor will be in a position to measure surrounding fluid and not be up against tissue as the device is advanced. For example, more than one temperature sensor may be arranged at more than one location circumferentially around the device. Alternatively or additionally, more than one temperature sensor may be arranged at more than one location along the length of the device.

The monitor/controller of the device may analyze the signals for the one or more types of sensors to determine the location of the device. Some signal types may provide more confidence than others and may override others. Some signal types may take longer to analyze and may serve as confirming or non-confirming signals to a previous signal. The monitor may receive signals from the sensors on a continual, intermittent, or on demand basis. Some signal types may be received and analyzed essentially in real time, while some signal types may take longer to receive and analyze.

Some embodiments of the gastric access device include the ability to monitor gastric residual volume or gastric emptying. Some embodiments include the ability to control the feed rate and/or amount based on the gastric residual volume or gastric emptying.

Some embodiments of the gastric access device include preventing, identifying and/or managing gastric reflux.

In some embodiments, the sensor types may be used for monitoring the patient also. For example, temperature sensors may be used to both locate the device, and also monitor patient temperature once the device is in place. Impedance/conductivity sensors may be used for determining device location, reflux identification, and/or monitoring gastric residual volume or gastric emptying over time after the device is placed. ECG sensors may be used for placement and also to monitor the patient's ECG after the device is placed. ECG sensors, impedance/conductivity sensors, and/or other sensors may use the same, or different, electrodes.

In one embodiment, a feeding tube system may generally comprise a gastric access device having a length, a controller in communication with the gastric access device, and one or more impedance or conductivity sensors positioned along the length with at least one impedance or conductivity sensor positioned at or in proximity to a distal end of the length, wherein each of the one or more impedance or conductivity sensors is in communication with the controller which is configured to receive a first signal and confirm that the first signal is indicative of an impedance or conductivity level of a fluid within a subject and in contact with the one or more impedance or conductivity sensors. Additionally, one or more temperature sensors may be positioned along the length and in communication with the controller which is further configured to receive a second signal and confirm that the second signal is indicative of a temperature level of an environment within the subject that is associated with respiration and in contact with the one or more temperature sensors. Furthermore, the controller may be configured to receive the first signal and the second signal and determine whether a placement of the gastric access device is within a stomach of the subject.

In one embodiment for a method of use, a method of positioning a device within a stomach of a subject may generally comprise sensing for an impedance or conductivity level of a fluid within a subject when one or more impedance or conductivity sensors positioned along a length of a gastric access device contacts the fluid as the gastric access device is advanced within the subject. Additionally, the method may include sensing for a temperature level of an environment within the subject that is associated with respiration with one or more temperature sensors positioned along the length, receiving a first signal from the one or more impedance or conductivity sensors and a second signal from the one or more temperature sensors into a controller in communication with the gastric access device, and determining via the controller when the first signal is indicative of the fluid within the stomach and the second signal is indicative of an absence of a temperature signal of the environment within the subject that is associated with respiration.

In another embodiment of a feeding tube system, the system may generally comprise a gastric access device having a length, a controller in communication with the gastric access device, and one or more impedance or conductivity sensors positioned along the length with at least one impedance or conductivity sensor positioned at or in proximity to a distal end of the length, wherein each of the one or more impedance or conductivity sensors is in communication with the controller which is configured to receive a first signal and confirm that the first signal is indicative of an impedance or conductivity level of an environment within a subject and in contact with the one or more impedance or conductivity sensors. Additionally, one or more temperature sensors may be positioned along the length and in communication with the controller which is further configured to receive a second signal and confirm that the second signal is indicative of a temperature level of a region within the subject that is associated with respiration and in contact with the one or more temperature sensors. Furthermore, the controller may be configured to indicate a pause in advancement of the gastric access device into the subject until the second signal indicates an absence of the temperature level of the region associated with respiration.

In another embodiment of a method of positioning a device within a stomach of a subject, the method may generally comprise sensing for an impedance or conductivity level of an environment within a subject when one or more impedance or conductivity sensors positioned along a length of a gastric access device contacts the fluid as the gastric access device is advanced within the subject, and sensing for a temperature level of a region within the subject that is associated with respiration with one or more temperature sensors positioned along the length. Additionally, the method may include receiving a first signal from the one or more impedance or conductivity sensors and a second signal from the one or more temperature sensors into a controller in communication with the gastric access device, and pausing an advancement of the gastric access device into the subject until the second signal indicates an absence of the temperature level of the region associated with respiration.

BRIEF DESCRIPTION OF THE DRAWINGS

Various exemplary embodiments are described in detail with reference to the following figures, wherein:

FIGS. 11A, 11B, and 12 and 13 show some embodiments of the gastric access device.

FIG. 14 shows detail of the monitor of some embodiments.

FIGS. 15A and 15B show an embodiment of the gastric access device which includes tissue sensing electrode(s) for sensing impedance/conductivity of tissue.

FIGS. 16A and 16B and 16C show an embodiment of the gastric access device which includes tissue electrode(s)/sensor(s), as well as reflux sensor(s).

FIG. 27 shows an embodiment where temperature sensors may use the same electrodes as impedance/conductivity electrodes.

FIG. 28A shows the gastric access device within a scale which shows the approximate length of different sections of the anatomy.

FIG. 28B shows an example of placement of the gastric access device within a child.

DETAILED DESCRIPTION OF THE INVENTION

For convenience of explanation, exemplary embodiments are described below with reference to the figures in the context of placing feeding tubes, assessing gastric residual volume/emptying, and preventing/identifying/managing/monitoring gastric reflux in patients.

Figure 1:
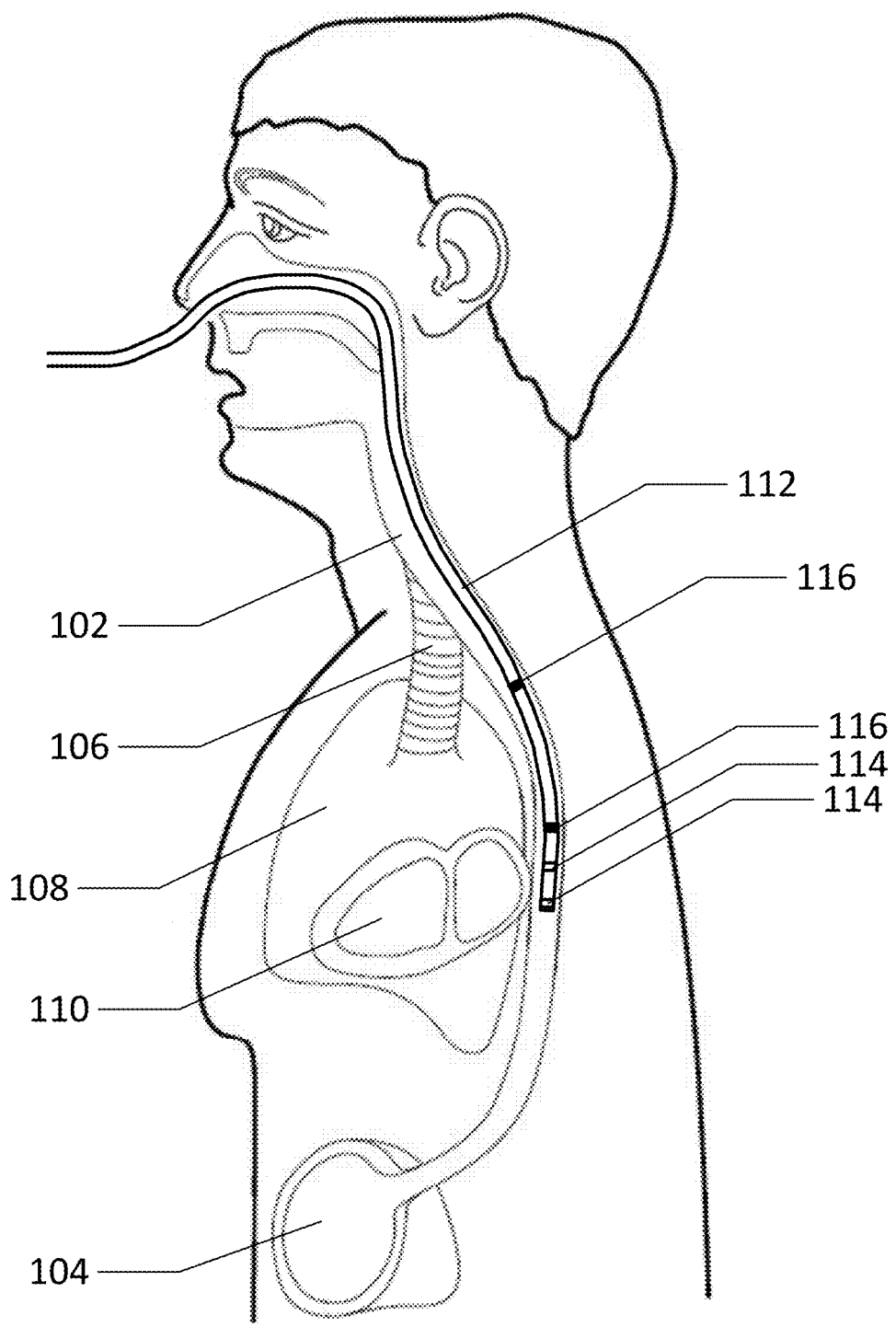
FIG. 1 shows an embodiment of the gastric access device in place in the human anatomy.

FIG. 1 shows an embodiment of the gastric access device in place in the human anatomy. The anatomy includes esophagus 102, stomach 104, trachea 106 lungs 108 and heart 110. Gastric access device 112 is shown advancing to the stomach via the esophagus. The gastric access device includes sensors of one, two, three or more types to aid on accessing the stomach or other areas of the gastric track, as well as to assess gastric residual volume or gastric emptying, as well as preventing, identifying and/or managing reflux, during feeding. The gastric access device may include a lumen for introducing feed to the stomach of the patient. Alternatively, the gastric access device may be used in conjunction with a feeding tube (inside a feeding tube or alongside a feeding tube.

In FIG. 1, two types of sensors are shown: type 1 designated by 114 and type 2 designated by 116. In some embodiments sensor type 1 might be a pair of, or multiple, electrodes for sensing impedance or conductivity. Type 2 sensors may be temperature sensors. Other types of sensors include humidity sensors, pressure sensors, chemical sensors, ECG sensors, EGG (Electrogastrogram) sensors, pH sensors, light sensors, etc. For example, pressure sensors or humidity sensors may be used to detect pressure or humidity fluctuations associated with breathing and therefore determine when the device is in the trachea/lungs.

The sensors may be used to help with device placement or may be used to assess gastric emptying/contents, or preventing, identifying and/or managing reflux, or may be used for any two or more of these purposes. For example, some embodiments of the gastric access device includes at least one impedance sensor to measure impedance of the environment around the sensor and at least one temperature sensor. The impedance sensor(s) may be used for device placement and/or gastric emptying monitoring and/or reflux, while the temperature sensor(s) may be used for device placement, and possibly for ongoing patient temperature monitoring.

One or more temperature sensors may be used for device placement by sensing the relatively small temperature fluctuations caused by breathing ambient air that is at a temperature different than that of the body. For example, room temperature air is normally below the temperature of the body. If the gastric access device is advanced into the trachea by mistake, instead of into the esophagus, the temperature sensor(s) on the gastric access device will detect the temperature fluctuations associated with breathing. These temperature fluctuations are not present when the gastric access device is property placed in the gastric system, i.e., in the esophagus, stomach or intestines.

A temperature sensor on the gastric access device transfers a temperature signal from the sensor to a controller via leads in the gastric access device. This temperature signal will show fluctuations associated with breathing when the gastric access device is incorrectly placed in the trachea or the lungs. This is important because this is a dangerous mistake and can cause complications and even death if feed is subsequently introduced into the lungs by mistake.

The embodiment in FIG. 1, for example, may include 2 or more impedance sensors 114 and 2 or more temperature sensors 116. The impedance sensors may be used for device placement, and/or for measuring gastric residual volume (GRV)/gastric emptying, and/or for reflux. Details of embodiments that include GRV/gastric emptying using impedance or other sensors are included in US patent publication 2017-0071502 filed Nov. 23, 2016, US patent publication 2016-0331298 filed Jul. 28, 2016, and US patent publication 2018-0078195 filed Nov. 13, 20176, each of which is herein incorporated by reference in its entirety. The temperature sensors may be used to confirm device placement, or in certain circumstances, serve as the primary placement indicator.

Figure 2:
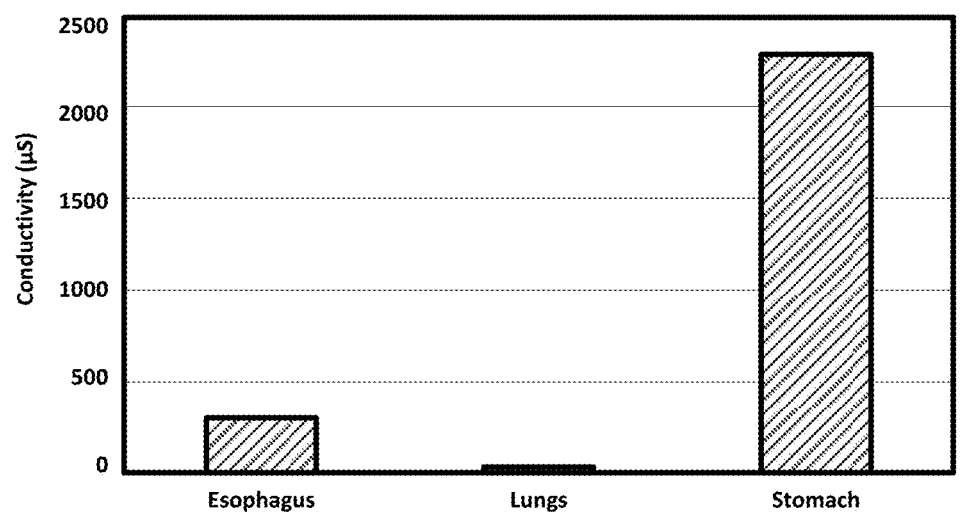
FIG. 2 shows the relative conductivity sensed by impedance or conductivity sensors incorporated into the gastric access device in different areas of the anatomy.

FIG. 2 shows the relative conductivity sensed by impedance or conductivity sensors incorporated into the gastric access device in different areas of the anatomy. The conductivity in the stomach is notably higher than that in the lungs. As the gastric access device is advanced through the nose or mouth, into the esophagus and presumably into the stomach, the conductivity/impedance sensor(s) can identify when the distal tip of the device is in the stomach by this increase in conductivity (or decrease in impedance) due to contact with the stomach's fluid contents, which generally have a higher conductivity (lower impedance) than the environment or fluid of the esophagus. This sensing is also in real time, or fairly quick, on the order of less than one second or a few (1-4) seconds. However, there may be situations where this change in impedance/conductance is not as clear, or where the impedance/conductivity sensors on the gastric access device may sense an area of high conductivity in the trachea or lungs, such as a situation where the sensors are embedded in mucus or up against tissue.

To confirm that the gastric access device is positioned in the stomach and not the lungs or trachea, a secondary sensing system may be utilized. For example, one or more temperature sensors may be used on the gastric access device to sense temperature fluctuations, or the lack of temperature fluctuations, caused by breathing. If temperature fluctuations associated with breathing are detected, it is likely the device is in the trachea or the lungs and should be retracted. If no temperature fluctuations associated with breathing are detected, and the impedance sensor(s) show high conductivity/low impedance, the device is likely in the stomach. Temperature fluctuations associated with breathing will likely have a frequency associated with breathing, for example:

birth to 6 weeks: 30-40 breaths per minute
6 months: 25-40 breaths per minute
3 years: 20-30 breaths per minute
6 years: 18-25 breaths per minute
10 years: 17-23 breaths per minute
Adults: 12-18 breaths per minute
Elderly≥65 years old: 12-28 breaths per minute
Elderly≥80 years old: 10-30 breaths per minute The controller may incorporate a frequency filter to filter for these or other breathing frequencies to isolate temperature fluctuations associated with breathing from the temperature signal over time.

These frequencies can be used by the controller/monitor to determine that temperature fluctuations are or are not associated with breathing. This signal may need to be analyzed across more than one breath and as a result, may take longer for the controller to analyze than the impedance/conductance signal. The determination of whether the temperature signal represents breaths may take 8-15 or 10-20 seconds. As a result, the temperature readings may be used as a secondary indicator of device placement—a confirmation of the impedance sensor indication of placement. The user may be prompted by the device to pause advancement of the device while this confirmation is taking place.

Figure 3:
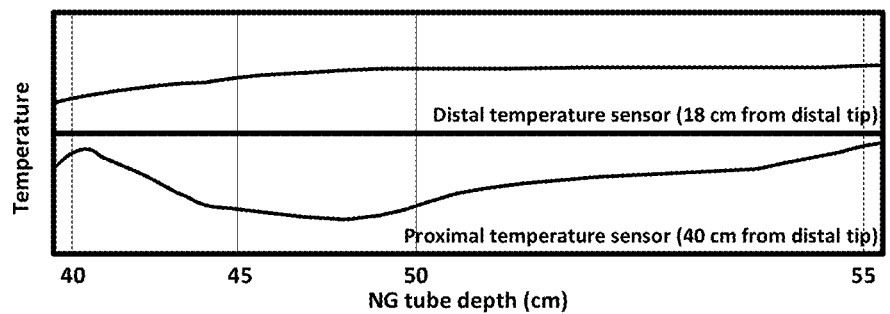
FIG. 3 and FIG. 4 show readings from a gastric access device with 2 temperature sensors.
Figure 4:
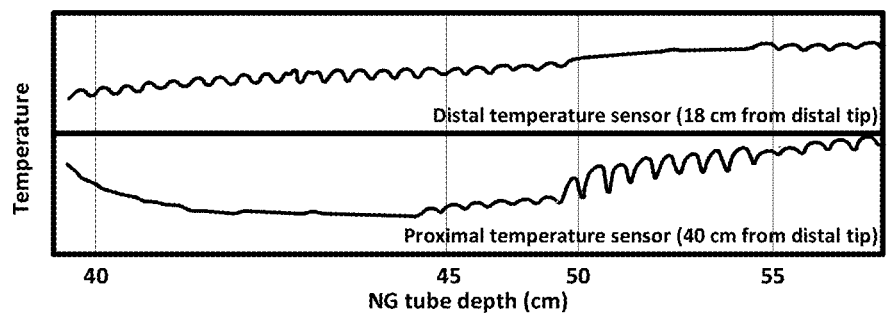

FIGS. 3 and FIG. 4 show readings from a gastric access device with 2 temperature sensors, one sensor 18 cm from the distal tip of the device and one sensor 40 cm from the distal tip of the device. FIG. 3 shows temperature readings when the device is placed in the esophagus or the stomach of the patient. FIG. 4 shows temperature readings when the device is placed in the trachea or the lung of a patient. In some embodiments, at least one temperature sensor may be designed so that it is positioned in the trachea when the device tip is in the lungs of the patient.

FIG. 4 shows temperature fluctuations in the temperature signal associated with breathing where FIG. 3 does not. When a temperature sensor is up against or embedded in tissue, the temperature fluctuations may not be detected, even when temperature fluctuations are present in the environment around the tissue. This is shown in the top graph in FIG. 4. As the device was advanced into the lungs, the distal most sensor was somewhat embedded in tissue and the temperature signal flattened out. A second, more proximal, temperature sensor clearly showed the temperature fluctuations on the lower graph of FIG. 4. Because of this phenomenon, 2 or more temperature sensors may be beneficial, where the controller looks for temperature fluctuations associated with breathing from at least one of the temperature sensors. Temperature sensors (or any sensors) may also be placed on different locations of the device, both along its length, and/or around its circumference. For example, temperature sensors may be placed 180 degrees away from each other around the radius of the gastric access device and/or along its length.

In some embodiments, temperature sensors are used to sense temperature at the point when and where the device first enters the body. The temperature sensors may sense temperature fluctuations due to breathing in the throat of the patient as the device is inserted. These fluctuations may stop as the device passes the junction between the trachea and the esophagus. As this is a relatively short distance into the patient (i.e. around 5-15 cm), the flattening of temperature fluctuations at this distance may be an indicator that the device is properly propagating down the esophagus vs. the trachea. This temperature fluctuation flattening or disappearance at this relatively short distance into the patient is a further indicator that the device is being correctly placed. Alternatively, the lack of flattening of temperature fluctuations, or the increase in magnitude of temperature fluctuations as the device is advanced is an indication that the device is being advanced into the trachea. The distance beyond the lips that the device has been advanced may be automatically determined by the system by utilizing dimensional markings, or landmarks, along the length of the shaft of the device and a camera, or other detection mechanism, at the lips/device entry point.

In some embodiments, one or more temperature sensors on the feeding tube may sense ambient temperature before the tube is inserted into the patient. In some embodiments, ambient temperature may be continuously or intermittently measured over time using a temperature sensor outside of the patient, such as an ambient temperature sensor incorporated into the controller, or an ambient temperature sensor at the proximal end of the feeding tube which remains outside of the patient. An ambient temperature sensor may also be apart from both the feeding tube and the controller, but in communication with the controller. Ambient temperature may be used to determine the relative temperature of the patient at different locations within the anatomy, by comparing the temperature sensed by the sensors on the feeding tube to ambient temperature. In this way, relative temperature can be measured at different locations along the feeding tube, and within the anatomy. Also, an average temperature may be used by looking at a dampened, temperature signal. An average, or dampened, temperature signal may not show the same fluctuations of temperature in the lungs, or lack of fluctuationss of temperature in the esophogus, but the average temperature in the lungs will be lower than that in the esophogus, if the ambient temperature is below body temperature. By monitoring the average/dampened temperature, at one point, at two points, or along the feeding tube, as the device is advanced, the controller can determine approximately where in the anatomy the device is. Different signals at different locations along the length of the feeding tube will provide temperature information (either average temperatures or temperature fluctuations) that can indicate if that segment of the feeding tube is in the pharynx, trachea, esophagus, lung, stomach, intestines or up against tissue. Other sensors, such as impedance/conductivity sensors, may be used to help identify the location. For example, if the temperature sensors are measuring body temperature and no fluctuations in temperature, the portion of the feeding tube with these sensors may be in the stomach, or may be up against tissue. Conductivity/impedance sensors may be able to differentiate between the two. ECG may also be used, or pH, or other sensor types.

Figure 5:
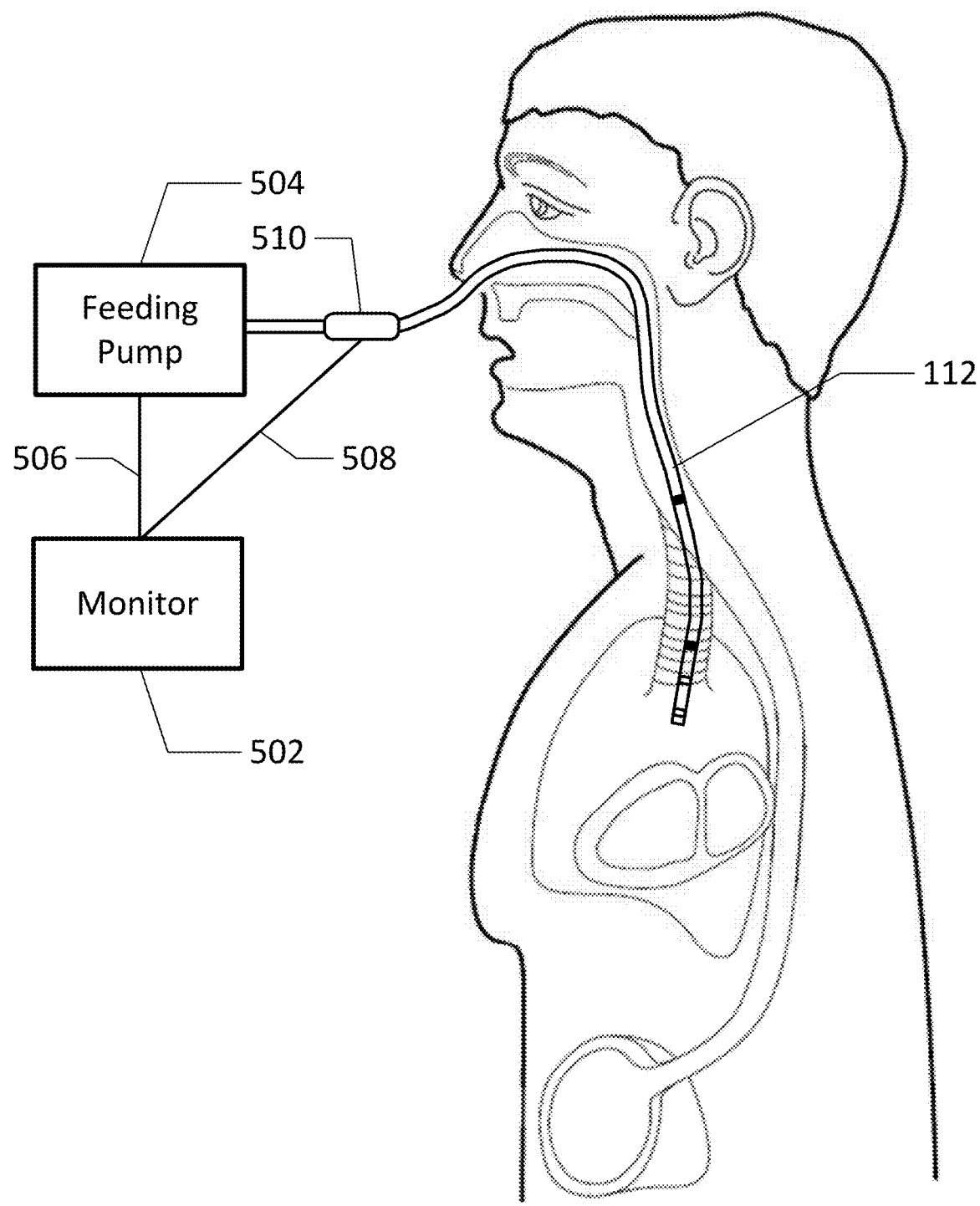
FIG. 5 shows the gastric access device advancing through the trachea and into the lungs.

FIG. 5 shows the gastric access device advancing through the trachea and into the lungs. This is an undesirable situation and embodiments of the gastric access device identifies it as such. The impedance/conductivity sensors would not sense the significant increase in conductivity shown in the graph in FIG. 2. In addition, the temperature sensors would detect fluctuations in temperature associated with breathing, as shown in FIG. 4. These signals are received by controller/monitor 502 via wired or wireless connection 508 which is connected to gastric access device 112 via hub 510. The sensors on access device 112 are in electrical connection with hub 510 via leads within device 112 that run from the various sensors to hub 510. Monitor 502 may also be connected to feeding pump 504 via wired or wireless connection 506 to control the feeding of the patient via a feeding lumen of device 112, or via a separate feeding tube. The monitor interprets one or more of these signals and indicate that the device is not properly placed and needs to be retracted.

Figure 6:
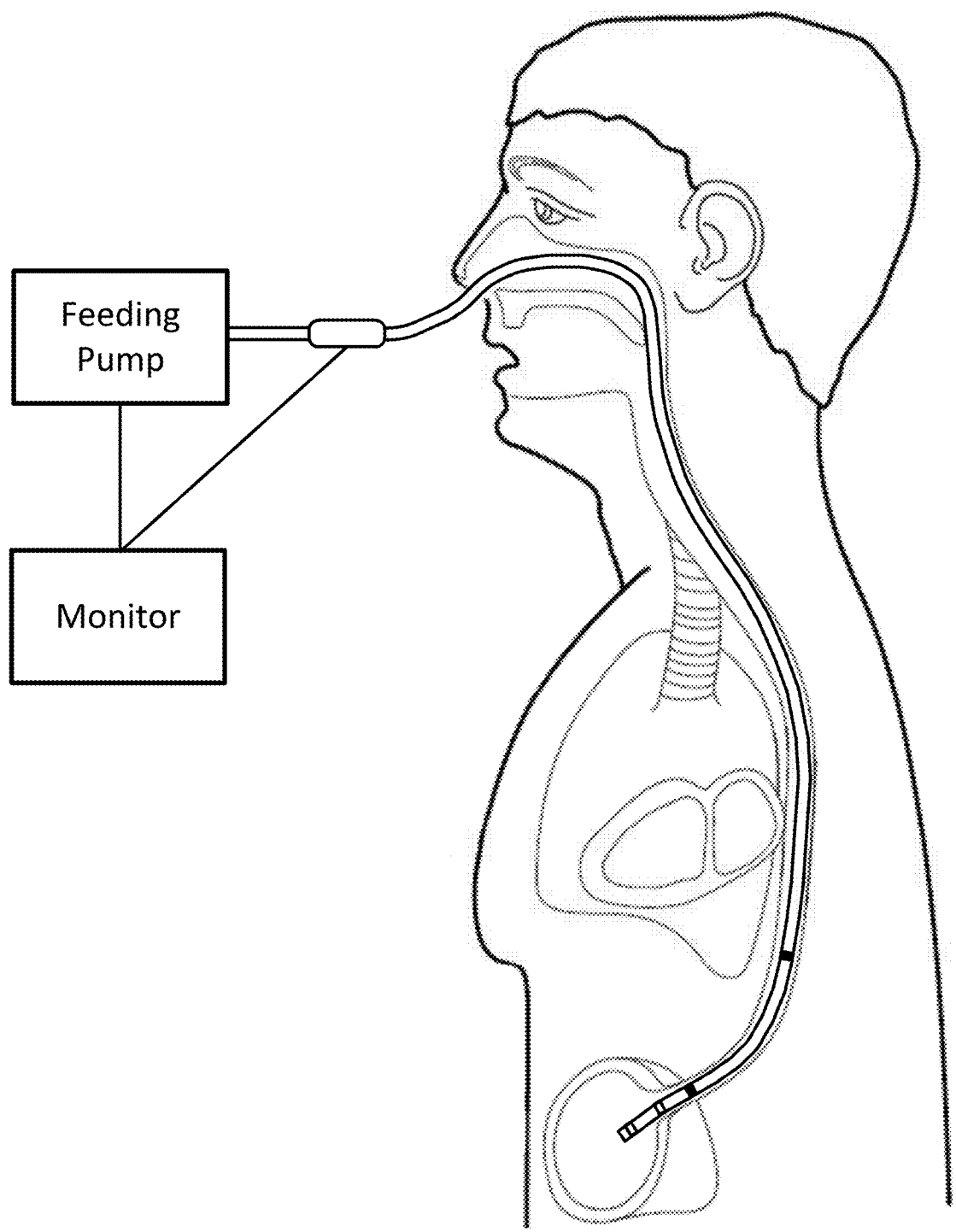
FIG. 6 shows the gastric access device placed in the stomach of the patient.

FIG. 6 shows the gastric access device placed in the stomach of the patient. In this situation, an impedance/conductivity sensor shows high conductivity and temperature sensor(s) show no temperature fluctuations associated with breathing. The monitor interprets one or more of these signals and indicate that the device is properly placed in the stomach.

Figure 7:
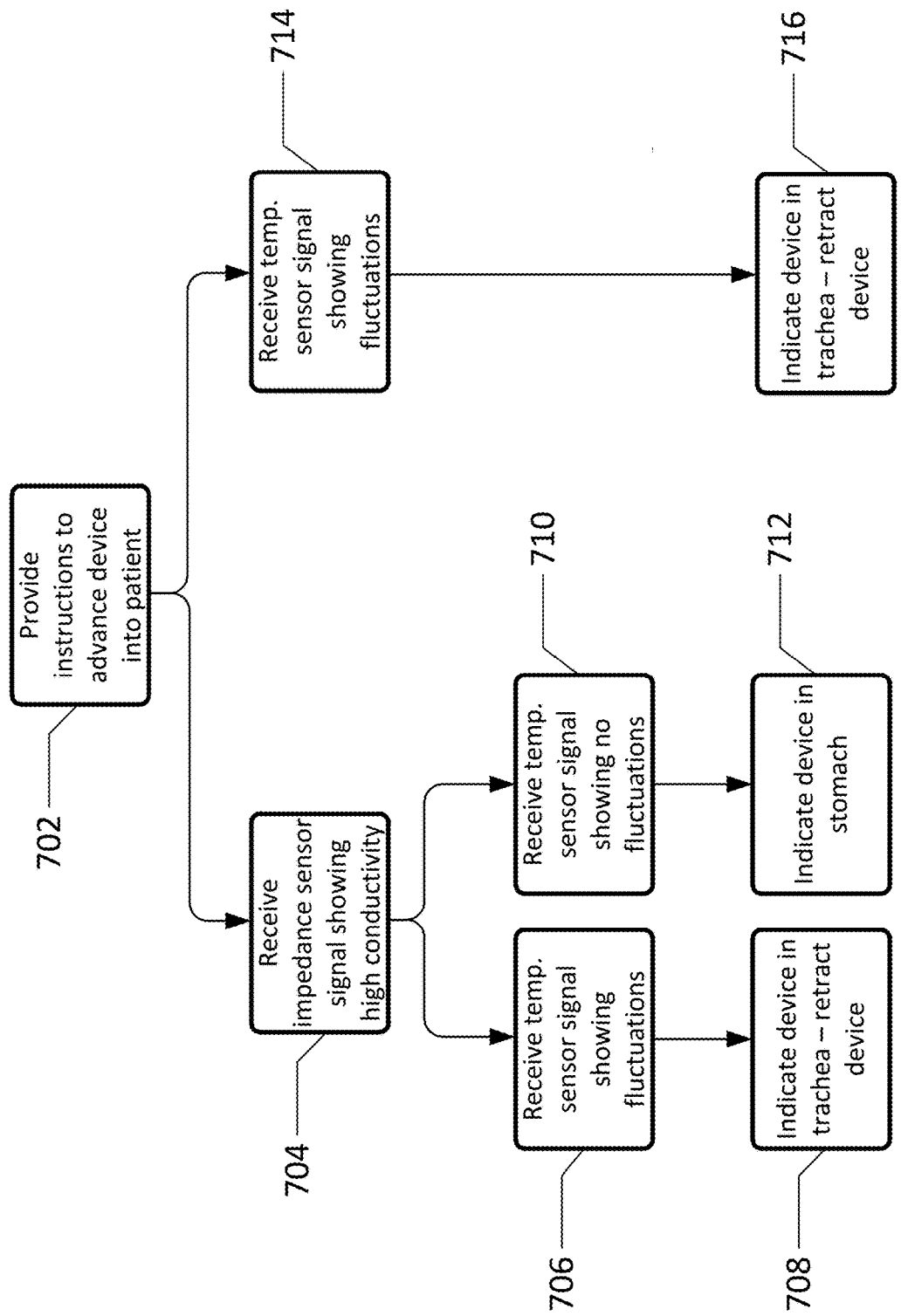
FIG. 7 shows a flowchart outlining the functions of the controller in communication with a gastric access device with impedance/conductivity sensor(s) and temperature sensor(s).

FIG. 7 shows a flowchart outlining the functions of the controller in communication with a gastric access device with impedance/conductivity sensor(s) and temperature sensor(s). Box 702 represents the controller indicating to the user to advance the device into the patient. As the device is advanced, the controller receives signals from the sensors incorporated into the gastric access device. The controller may continue to instruct that the user to advance the device until either an impedance/conductivity sensor senses high conductivity or low impedance, or until the temperature sensor(s) detects temperature fluctuations associated with breathing.

If the controller receives signals from the temperature sensors showing temperature fluctuations associated with breathing, where the temperature sensor is past the RGJ (Respiratory-Gastric Junction), as shown in box 714, the controller will indicate to the user that the device is likely in the trachea or lungs and instruct the user to retract the device, as shown in box 716.

If, during device advancement, the sensors first sense high conductivity, as shown in box 704, it is possible the gastric access device is in the stomach, and the sensors are sensing stomach contents. The controller may indicate that the device is in the stomach, or the controller may ask the user to pause for a few seconds, by displaying or playing a pause signal, so that it can gather temperature sensor signal data to determine whether there are fluctuations associated with breathing detected by the temperature sensors. If these fluctuations are detected, where the temperature sensor is past the RGJ, as shown in box 706, the controller determines that the access device may be in the lungs and may instruct the user to retract the device, as shown in box 708. If the temperature fluctuations are not detected, as shown by box 710, the controller may confirm that the device is correctly placed in the stomach as shown in box 712.

Figure 8:
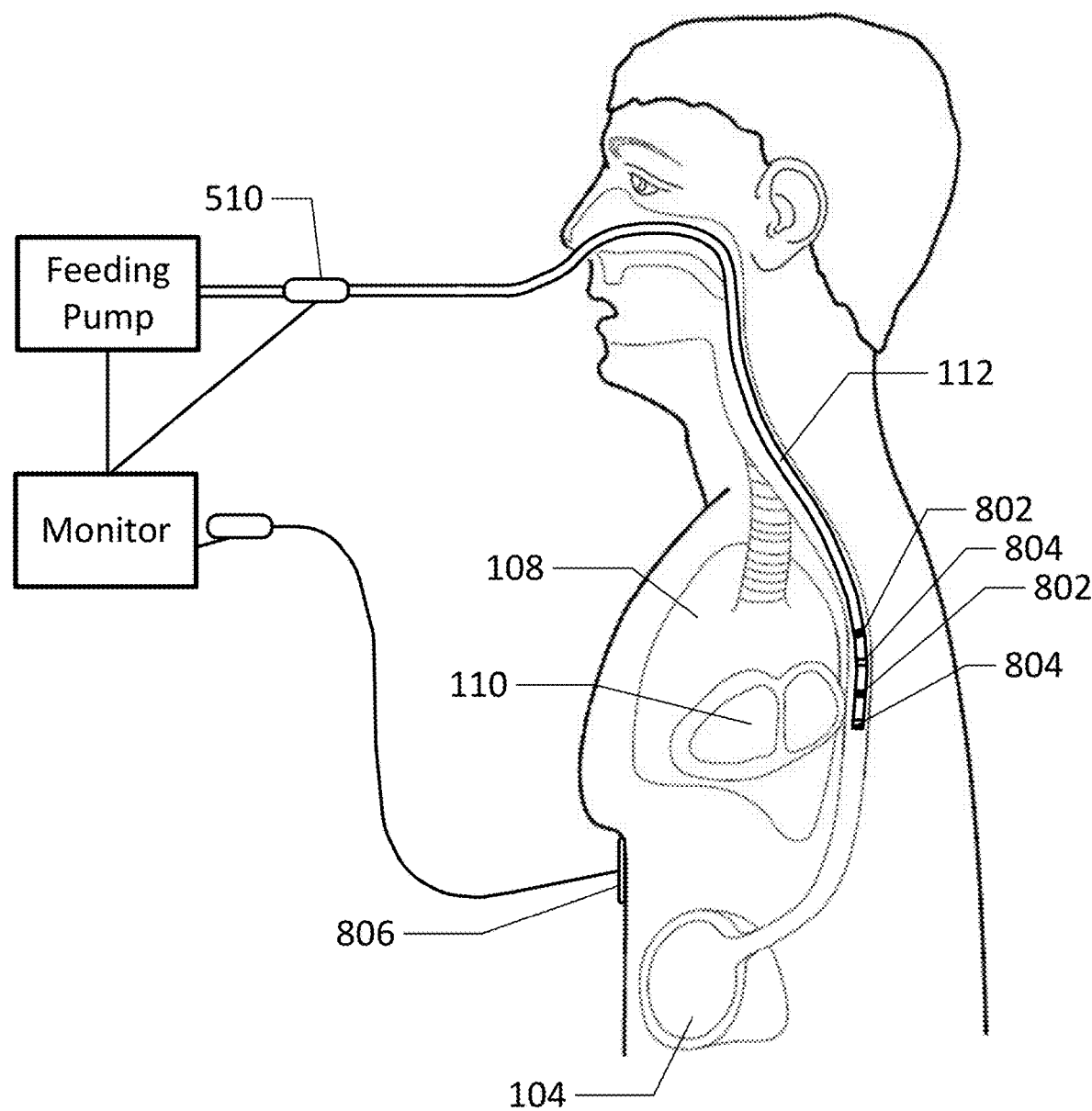
FIG. 8 shows the gastric access device feeding tube as the sensors are approaching the heart.

Other sensors, in addition to, or instead of, impedance/conductivity sensors and temperature sensors may be used to determine the location of the gastric access device within the anatomy. For example, electrocardiography (ECG) sensor or sensors may be used to determine whether the gastric access device is above or below the heart. If the device is below the heart, it is not likely in the lungs or trachea, and is therefore likely in the stomach. FIG. 8 shows the relative anatomy of lungs 108, heart 110 and stomach 0104. Note that the stomach is below the heart, while the lungs are above, or around the level of the heart. Some embodiments of the gastric access device may include ECG sensors 802 in addition to impedance sensors 804. These sensors, like other sensors on the gastric access device disclosed herein, have leads or wires running along the length of the device to connect the device to device hub 510. The device hub is electrically connected to the monitor, which receives the signals from the various sensors. In some embodiments, both sensor types utilize the same electrodes.

The ECG sensors will sense electrical activity of the heart, including, for example, a signal including a P zone, Q zone, R zone, S zone, T zone, U zone, origination of the signal etc. The signal will have a magnitude and frequency, and the various zones may include peaks of various positive and negative magnitudes. The gastric access device may have 2 or more ECG sensors on the device itself, such as sensors 804. Alternatively, the gastric access device may have 1 or more ECG sensors, and the system may include external ECG sensor 806. The external ECG sensor is also in electrical communication with the monitor either by wire or wirelessly. As the gastric access device is advanced, the ECG signal may be continually received by the monitor. Because the ECG sensors are sensing electrical activity of the heart, the signal will change as the sensors traverse through the esophagus, past the heart toward the stomach. These changes may be in magnitude or direction (positive or negative) of one or more of the zones of the ECG signal. The changes may be different depending on the location of the ECG sensors within the system. For example, a system with one ECG sensor on the feeding tube, and one ECG on the sternum, may show a different change than a system with 2 or 3 ECG sensors on the feeding tube. Although the change may vary depending on the system configuration, the change is detectable by the controller for a given system configuration as the sensors pass the heart because of the change in relative location of at least one or more of the ECG sensors (the sensor(s) on the feeding tube) with respect to the heart.

FIG. 8 shows the gastric access device feeding tube as the sensors are approaching the level of the heart. At this point, it may still be unclear from the ECG sensor readings whether the access device is in the esophagus or the lungs. However, as the device is advanced down the esophagus, the ECG readings will change to a signature which indicates that the device is passing and/or past the heart. For example, the ECG signal may become inverted, or certain zones of the ECG may become inverted, or the magnitude of the signal may change, or the magnitude of certain zones of the ECG may change. Once the controller senses this signature, it will determine that the gastric access device is in the stomach, which is below the heart. External ECG sensor 806 may or may not be present.

The ECG sensors may be used in conjunction with any other sensors, including impedance/conductivity sensors and/or temperature sensors or other sensors to help locate the gastric access device in the stomach. Any of the sensor types may share the same electrodes with other sensor types.

Figure 9:
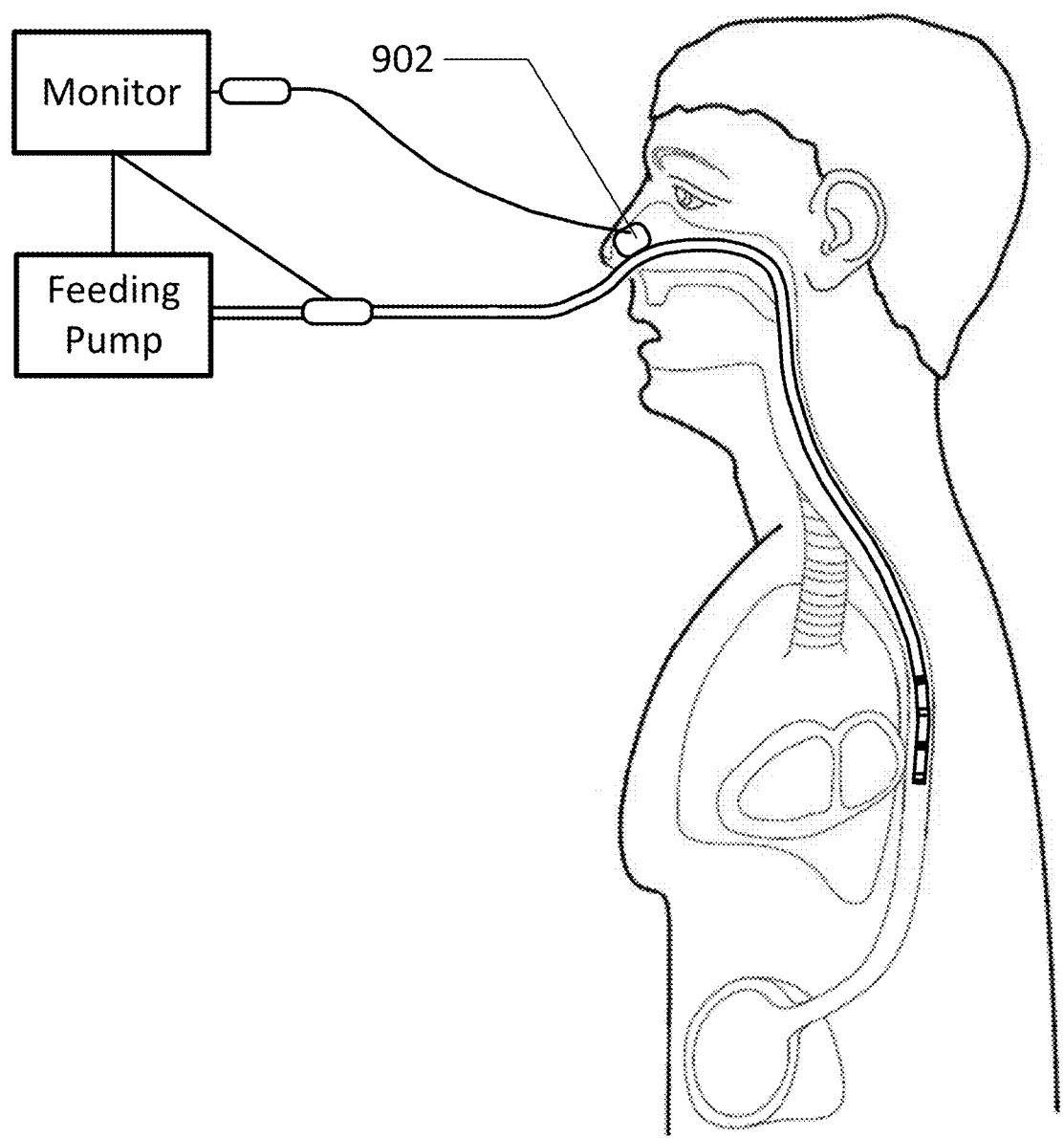
FIG. 9 shows an embodiment of the gastric access device with an ECG sensor incorporated into a nose, nostril, mouth or face patch.

FIG. 9 shows an embodiment of the gastric access device with an ECG sensor incorporated into nose or nostril or mouth or face patch 902. This sensor may be placed on the outside of the nose, the inside of the nose, the outside of the mouth, the inside of the mouth, or elsewhere on the face. This sensor may be incorporated into the gastric access device feeding tube itself, for example, as part of the tape holding the device in place.

Figure 10:
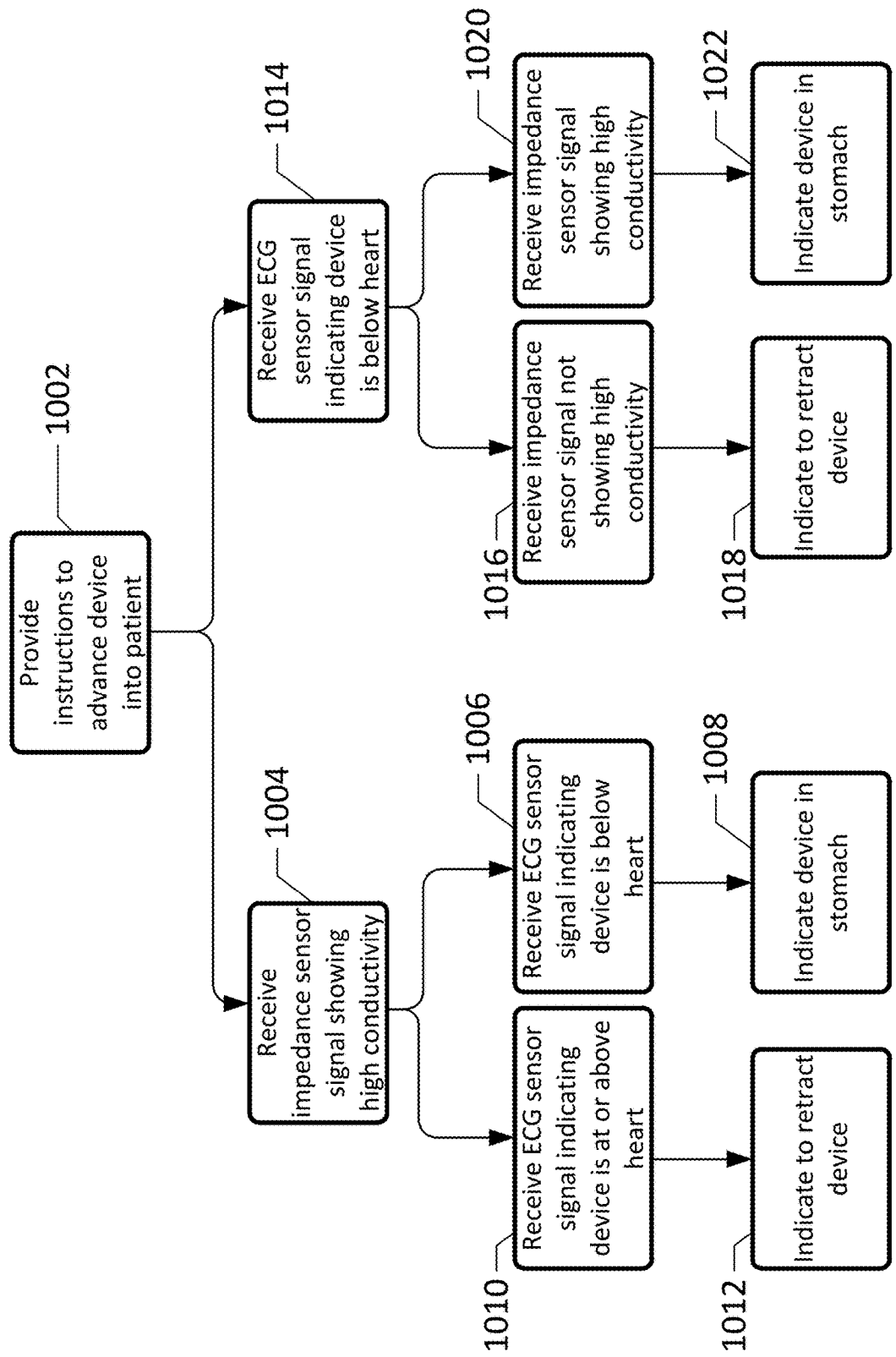
FIG. 10 shows a flowchart outlining the functions of the controller in communication with a gastric access device with impedance/conductivity sensor(s) and ECG sensor(s).

FIG. 10 shows a flowchart outlining the functions of the controller in communication with a gastric access device with impedance/conductivity sensor(s) and ECG sensor(s). Box 1002 represents the controller indicating to the user to advance the device into the patient. As the device is advanced, the controller receives signals from the sensors incorporated into the gastric access device. The controller may continue to instruct that the user to advance the device until either an impedance/conductivity sensor senses high conductivity or low impedance, or until the ECG sensor(s) detects a change in the ECG signal indicating that the device has passed below the heart.

If the controller receives signals from the ECG sensors showing that the device is below the heart, as shown in box 1014, the controller may indicate to the user that the device is likely in the stomach. Alternatively or additionally, the controller may use the signals from the conductivity sensors to confirm placement. If the controller has not received a signal from the impedance sensor(s) on the device indicating high conductivity, or low impedance, as shown in box 1016, then the controller may indicate to the user to retract the device, as it is possibly not in the stomach, as is shown in box 1018. However, if the impedance sensors have received a signal from the impedance sensor(s) on the device indicating high conductivity, or low impedance, as shown in box 1020, then the controller will indicate to the user that the device is likely in the stomach, as shown in box 1022.

If, during device advancement, the sensors first sense high conductivity, as shown in box 1004, it is possible the gastric access device is in the stomach. The controller may indicate that the device is in the stomach, and/or the controller may analyze ECG sensor signal data to determine whether the ECG signal signature shows the device has passed the heart. If this signature is detected, as shown in box 1006, the controller determines and communicates that the access device is likely in the stomach, as shown in box 1008. If the ECG sensor signal signature indicates that the device has not passed below the heart, as shown by box 1010, the controller may indicate that the device may not be in the stomach and may indicate to retract the device and re-advance, as shown in box 1012.

Steps 1006 and 1014 (and similarly, step 704, in FIG. 7), showing that the ECG signal indicates that the device is below the heart, may include a sub-step of checking to make sure the end of the feeding tube has not prolapsed, causing an incorrect signal signature. This can be done by checking the impedance/conductivity between different sensors, or different pairs of electrodes, to see if they are closer to each other than they would be if the feeding tube were relatively straight. For example, the controller may quickly check to see if there is unusually high conductivity between the distal most impedance sensor and the next nearest impedance sensor. The controller may then check whether there is unusually high conductivity between the distal most impedance sensor and the impedance sensor which is one sensor further than the nearest impedance sensor etc. If there is no unusually high conductivity between two impedance sensors on the feeding tube, the tube is likely not prolapsed and the ECG signal signature can be relied on.

Although the flow charts have shown the flow of embodiments with two types of sensors, where one type of sensor may confirm or question device placement based on the other type of sensor, it is understood that embodiments of the gastric access device may incorporate one, two, three, or more types of sensors. The sensors may operate independently, for example with certain patient types or in certain environments, or may operate in concert, as shown in the flow charts herein. Additionally, not all the sensors may be used for all patients. For example, embodiments of the device may include 3 types of sensors, for example, temperature, impedance/conductance and ECG sensors. One, two, or three types of sensors may be used for different patients and/or different environments. For example, 3 sensors may be used on most patients, but in a warm room, the temperature sensor may not be used. As another example, ECG sensors may not be used on a patient with a known arrhythmia. In some embodiments, there are two types of sensors so that one or two types may be used in the majority of patients and environments. In some embodiments there are two or more types of sensors for placement confirmation redundancy.

FIGS. 11A, 11B, and 12 and 13 show some embodiments of the gastric access device. FIG. 11A shows main device shaft 1102, feeding pump connector 1104 and monitor connector 1106. FIG. 11B is a blow-up of the section of FIG. 11A inside the oval outline. FIG. 11B includes electrodes 1108, where any pair of electrodes represents an impedance/conductivity sensor. Pairs of electrodes making up a sensor need not be adjacent each other. Temperature sensors, such as thermistors, or thermocouples 1110 are also shown, as well as openings 1112 to allow feed to exit the device. FIG. 11B also shows some example distances of the various sensors from the tip of the device. FIG. 11B shows the device with 2 temperature sensors 1110 which are 180 degrees from each other circumferentially and at different points along the length of the device. FIG. 12 shows 4 temperature sensors 1110 where the sensors oppose each other circumferentially by 180 degrees at two different locations along the length of the device. Two locations are shown here, but one, or more than 2 locations may include temperature sensors. FIG. 13 shows temperature sensors 1110 which wrap 360 degrees around the device, encircling it completely. These, and other, embodiments allow the temperature sensors to sense the fluctuations associated with breathing when the device is in the lungs so that the controller of the device may instruct the user to retract the device. As shown in FIG. 4, having temperature sensors in more than one location (either circumferentially, longitudinally, or both) may help detect the temperature fluctuations due to breathing in more circumstances. In some embodiments temperature sensors are placed greater than 90 degrees from each other circumferentially. In some embodiments temperature sensors are placed greater than 45 degrees from each other circumferentially. In some embodiments, at least 2 temperature sensors are placed in one location circumferentially. In some embodiments, at least 3 temperature sensors are placed in one location circumferentially. In some embodiments, at least 4 temperature sensors are placed in one location circumferentially. In some embodiments, at least 2 temperature sensors are placed circumferentially along the device length. In some embodiments, at least 3 temperature sensors are placed circumferentially along the device length. In some embodiments, at least 4 temperature sensors are placed circumferentially along the device length. Other configurations may also be envisioned. For example, the temperature sensor may be in the monitor, with a fluid path running from the sensor to the feeding tube. Also, sensors other than temperature sensors may be placed similarly.

One or more temperature sensors may be placed so that it is in the trachea if the distal tip of the device is in the lungs. For example this sensor may be placed at around 250-350 cm from the distal tip. Alternatively, this sensor may be placed at around 200-400 cm from the distal tip. Alternatively, this sensor may be placed at around 100-150 cm from the distal tip, for smaller patients. Alternatively, this sensor may be placed at around 100-200 cm from the distal tip.

In some embodiments, one or more temperature sensors may be placed on the outside of the gastric access device. In some embodiments, one or more temperature sensors may be placed completely within the wall of the gastric access device. In some embodiments, one or more temperature sensors may be placed within the wall of the gastric access device, so that the temperature sensor is exposed on the outside of the device.

ECG sensors and/or temperature sensors may be separate from impedance/conductance sensors, or may utilize some or all of the same electrodes. In embodiments where the same electrodes are used, different types of sensing (i.e. temperature, ECG and impedance/conductance) may alternate with the same electrodes, or be used at different locations, or points in time, of the procedure, or with different patients. Different or the same lead wires may be used for the different functions of a single electrode. Any of the sensors may utilize electrodes which completely encircle the device, or which only partially encircle the device.

FIG. 14 shows detail of monitor 502 of some embodiments. One or more display areas may display information to the user. For example, shown here is tube placement display area 1402, real time feed rate display area 1404, and feed rate over time or feed rate trend area 1406. Other display areas might include GRV/gastric emptying trend over time, real time GRV/gastric emptying, instructions for placement ("retract", "pause", "continue" etc.), warning displays, gastric reflux input, such as alerts for avoidance, identification of reflux events, management, etc. Audible prompts and/or warnings may also be played. Control buttons 1408 may include power buttons, settings buttons, etc., and may be physical buttons or touch screen buttons.

Placement display area 1402 may include a graphic representation of the anatomy, including the esophagus, the stomach and the lungs/trachea. This display may include colors to indicate correct, questionable, and incorrect placement. For example, if one or more types of sensors sense that the device is in the stomach, the stomach may flash or show green. If one or more types of sensors sense that the device is in the lungs, the lungs may flash or show red. If neither the stomach nor the lungs has been sensed by any type of sensor, the esophagus may flash green, or another color to indicate to the user to continue advancing. The distance the device has traveled into the patient may be incorporated into the placement assessment. In some embodiments, the controller in in communication with a sensor, such as an optical sensor, which automatically measures the length of the device which is in the patient. If there are conflicting signals from sensor types, or from any one sensor type, the corresponding area of the body may flash or show orange.

Further information may be displayed elsewhere on the monitor. In some embodiments, a body area indicator may flash, and then turn solid, as information is confirmed. For example, if the device is advanced into the stomach, and an impedance sensor senses higher conductivity, the stomach shape may flash green (or otherwise indicate to the user to pause the advancement of the device, or pause before the user or the controller initiates feeding), showing that preliminary the controller has determined that the device is in the stomach. The controller may then continue to collect temperature sensor data over a few to several seconds. If this data shows that the device is not likely in the lungs (no fluctuations associated with breathing), the stomach shape may turn solid green instead of flashing green (or a pause indicator may go away), allowing the user to initiate feeding or continue advancing the device.

Alternatively, if the temperature sensor show that there are temperature fluctuations, the stomach shape may turn orange or red, indicating a possibility of being in the lungs. Additionally or alternatively, the lungs may turn red or orange in this scenario. The controller may indicate to the user to retract the device and/or may prevent the feeding function from being initiated.

The pause to collect temperature data may be at least 1 second, at least 3 seconds, at least 5 seconds, at least 7 seconds, at least 10 seconds, at least 15 seconds, etc. The pause may be in the form of an indication to the user to not advance the device and/or not to initiate feeding through the device. The pause may cause the controller to prevent initiation of feeding through the device until after the pause has ended and the stomach has been positively identified and confirmed.

Other possible indicators which may be displayed on the display and/or audibly played and/or felt (such as a vibration) include:
pause
pause for x seconds
pause until indicator (visible, sound, tactile) says to advance or retract device
retract device x cm
advance device x cm
retract device x cm and pause
advance device x cm and pause
retract device x cm and then re-advance In some embodiments, placement display 1416, and/or other displays, are alternatively, or additionally on feeding tube 1412, and/or on remote device 1418, such as a mobile phone, tablet, computer, server, electronic medical record, etc. In some embodiments, the controller functions are fully, or partially included in the remote display. For example, some embodiments of the device may not include monitor enclosure 1410, but include a stand-alone feeding tube 1412 with display 1416. This smaller display may be fulling portable and may incorporate all or some of the monitor/controller functions. Some of the monitor functions may be incorporated into remote electronic device 1418. Feed input line 1414 is also shown. Monitor enclosure 1410 may include a docking area on which the feeding tube may be docked, so that the feeding tube may operate with placement display 1416, or with the full monitor display contained by enclosure 1410, if the feeding tube is docked in the monitor.

Other display areas not shown here may include data views, such as temperature data view and/or ECG data view which shows a graph of the signal from a type of sensor. Other display areas may include reflux information including risk, events, management and contextual (i.e. historical) info and trends.

The feed rate may be dependent on the sensed GRV/gastric emptying and may be controlled automatically by the controller or semi-automatically or manually. Semi-automatic control may include automatically controlling smaller adjustments but prompting the user for larger adjustments.

FIGS. 15A and 15B show an embodiment of the gastric access device which includes tissue sensing electrode(s) 1502 for sensing impedance/conductivity of tissue when in contact with tissue. These sensors may be used to identify the location of the LES (lower esophageal sphincter), the UES (upper esophageal sphincter) and/or the pyloric sphincter or other areas of the anatomy. The sphincter areas tend to have a smaller diameter than the tissue surrounding them which makes them more easily identified with contact sensors. They may be identified by sensing tissue contact with the electrodes of the gastric access device around the circumference of the device. In other words, more than one electrode may be positioned around the circumference of the device to determine tissue contact (for example when the sensors are within a reduced diameter area of the anatomy) between electrodes.

In some embodiments, the diameter of the shaft of the device may be larger at the location of the tissue sensing electrodes, than over other areas of the device. In some embodiments, the diameter of the shaft of the device at the location of the tissue sensing electrodes may be expandable and/or retractable, such as a cage, or balloon to increase tissue contact.

FIG. 15B shows a cross sectional view of the device in FIG. 15A. Note that tissue electrodes 1502 may protrude outside outer shaft 1504 of the device, so that they electrodes are more likely to contact tissue. In some embodiments, protruding electrodes may be retractable, or may be made to protrude different distances away from the shaft of the device. There may be 1, 2, 3, or more electrodes around the circumference of the device at any one or more locations along the shaft. Also shown here are electrode leads 1506 encased in outer shaft 1504. The location of the LES, UES, and/or pyloric sphincter may be identified by the level of tissue contact (how many electrodes around the circumference are in contact with tissue), as well as the length of the device which is inside the patient.

For example, the UES may be identified if the sensor is around 15-20 cm into the body (measured from the incisors). The LES may be identified if the sensor is around 3-50 cm into the body. They pyloric sphincter may be identified if the sensor is around 50-100 cm. These measurements targets may be narrowed by taking into account the size of the patient. Note that different tissue electrodes/sensors may be used along the length of the device shaft to identify different areas of the anatomy. The diameter, or the distance that the tissue electrodes protrude from the shaft, may also be used to determine which sphincter the electrodes are sensing.

This embodiment may or may not include impedance/conductance electrodes 1108 as well as temperature sensors 1110. In some embodiments, electrodes 1502 may be used for determining GRV/gastric emptying, or device placement, in addition to sensing impedance/conductivity of tissue.

Some embodiments of the gastric access device include the ability to avoid reflux events, sense reflux events or migration of the device, and manage reflux events, for example by suctioning the reflux material from the patient. The same sensors used for positioning may be used for this, or other sensors may be used.

FIGS. 16A and 16B and 16C show an embodiment of the gastric access device which includes tissue electrode(s)/sensor(s) 1502, as well as reflux sensor(s) 1602. One or more reflux sensors may be located on the more proximal area of the shaft to sense gastric reflux in the esophagus, above the LES. These sensors are designed to detect gastric reflux after the device has been placed in the patient. They are located so that one or more reside in the esophagus after device placement. They may be electrodes which sense impedance/conductivity, or they may be pH sensors or other sensors. There may be one, or more than one electrode around the circumference of the shaft of the device at any location along the shaft.

When a reflux sensor is in the presence of reflux fluid, the conductivity will increase, and the impedance will decrease. Because it may be advantages to avoid contact between the reflux sensor and the tissue of the esophagus, reflux sensors 1602 may be placed in recesses 1604 of the device outer shaft. This is shown in cross-sectional FIG. 16C. A cross section of the tissue sensor area is shown in FIG. 16B. Multiple reflux sensors along the length of the shaft of the device may help identify the extent of the reflux, i.e. how far up the esophagus, whether the reflux is progressing, regressing, and/or in danger of being aspirated. Alternatively, reflux sensor may be relatively flush with, or protrude outward slightly from, the outer surface of the shaft of the device.

Figure 17:
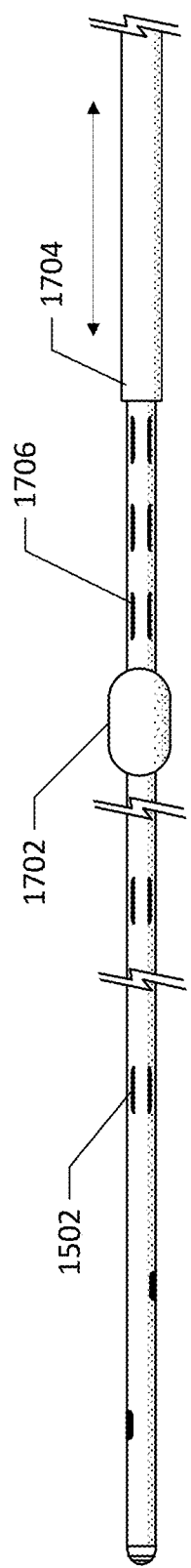
FIG. 17 shows the embodiment shown in FIG. 16A with the addition of an expandable member and a suction tube.

FIG. 17 shows the embodiment shown in FIG. 16A with the addition of expandable member 1702 and suction tube 1704. Reflux sensors 1706 may be used to identify the presence of reflux as described above. When reflux is sensed, or when reflux is sensed and determined to be a risk, the controller may expand the expandable member, which may be an inflatable balloon, or other mechanism, and apply suction to the suction tube to remove the reflux from the esophagus. The reflux sensors may sense when the reflux has been removed and the expandable member can be reduced in size and the suction can be stopped. These actions may be manually performed based on alerts or automatically performed by the controller.

Some embodiments may include suction tube 1704 without expandable member 1702. In these embodiments, the suction level may need to be controlled so that stomach contents are not suctioned into the esophagus. The suction tube may be located anywhere at or above the LES. In some embodiments, the suction tube may be moved along the shaft to precisely locate the suction. This locating of the suction tube may be determined by the level of reflux, which may be determined by the signals from the multiple reflux sensors along the length of the shaft of the device.

Figure 18:
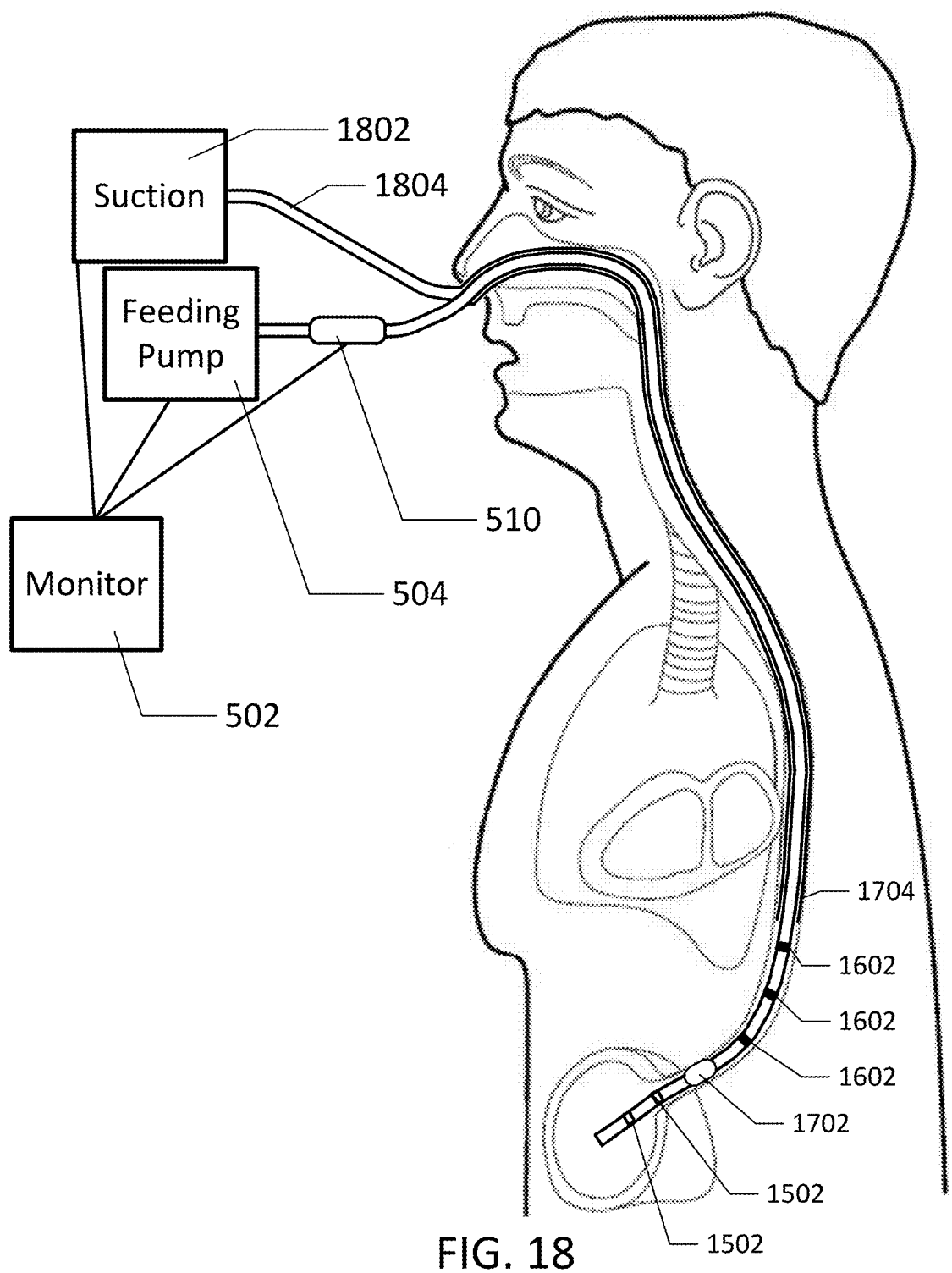
FIG. 18 shows the embodiment shown in FIG. 17 in place in the anatomy.

FIG. 18 shows the embodiment shown in FIG. 17 in place in the anatomy. Tissue sensors 1502 may aid in placement of the device. For example, they may locate the LES which allows the physician to know when the openings of the device are past the LES and therefor in the stomach and in place for feeding. Expandable member 1702 is shown just above the LES, and reflux sensors 1706 are shown in the esophagus. Suction tube 1704 is shown here further up the esophagus, but may be higher or lower in the esophagus.

The suction lumen of the suction tube is connected to suction device 1802. Suction device 1802 may be a pump, or may be a valve controlling wall suction or may be another suction mechanism. Suction line 1804 may or may not run through hub 510.

Figure 19:
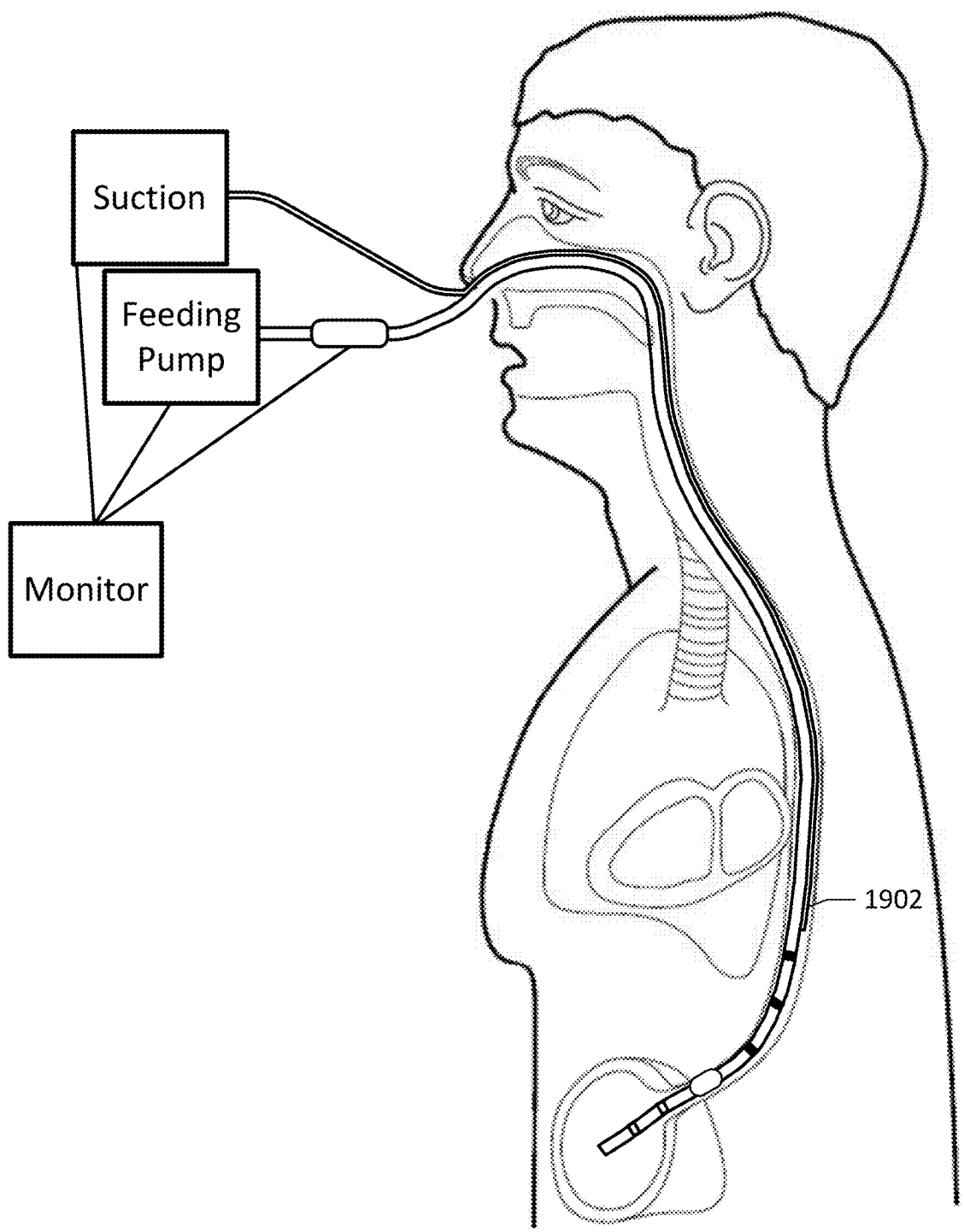
FIG. 19 shows an embodiment where the suction tube is next to the main device shaft of the gastric access device.

FIG. 18 shows the suction tube concentric with the main device shaft of the gastric access device. FIG. 19 shows another embodiment where suction tube 1902 is next to the main device shaft of the gastric access device, or along one side of the device. In some embodiments, the suction tube may be a separate device which may be introduced and removed separately from the gastric access device main shaft. It may alternatively be placed through a lumen of the gastric access device, or be part of, but outside of, the shaft of the gastric access device.

In some embodiments, suction of reflux is initiated and/or continued based on the signals from the reflux sensors, indicating that reflux is present in the esophagus. In some embodiments, the controller/monitor may be programmed to periodically apply a small amount of suction to the suction device to remove any reflux that may or may not be present, and/or test for reflux. This periodic application of suction may occur whether or not reflux is sensed. The expandable member may or may not be expanded for these periodic suction events. By performing periodic suction events, the system can effectively remove reflux risk without relying on sensing the reflux. Preferably, these periodically scheduled reflux suction events apply a low enough level of suction that stomach contents are not suctioned up in embodiments where the expandable member is either not present or not expanded. If reflux us sensed (either in the anatomy, or in the suction tube or elsewhere), or collected during a periodically scheduled reflux suction event, then the controller may be programmed to increase or prolong the suction event to make sure that all the reflux is suctioned. The controller may also trigger an expansion of the expansion member if the reflux suction event is increased in level of suction or prolonged.

Embodiments which include periodically scheduled reflux suction events, may not include reflux sensors on the device. Although they may include other reflux sensors to determine whether reflux is being suctioned out of the body. For example, reflux sensors may exist outside of the body, in the controller, waste receptacle, suction line, hub, etc. Periodically scheduled reflux suction events may be scheduled every 5 minutes, every 10 minutes, every 30 minutes, every 60 minutes, or every 5-30, or every 30-60 minutes, or any other appropriate time frame. The schedule may be scheduled by the user. The interval may change depending on past reflux events. For example, the scheduled reflux suction events may become more frequent if reflux is sensed once or more than once. This change may be manual or automatic.

In some embodiments, a low level of suction may be used on a continuous or semi-continuous basis. In these embodiments, the expansion member may not be expanded during the continuous suction, so that the esophagus is not blocked off for long periods of time. This continuous mode may be activated during feeding, at all times, or as a result of one or more reflux events.

In some embodiments, the expansion member may be expanded and block off the esophagus for longer periods of time, essentially acting as an artificial LES to prevent reflux.

Embodiments shown herein, such as those shown in FIGS. 15-20, may or may not include additional GRV sensors, such as those shown in FIGS. 11A, 11B, 12 and 13.

Figure 20:
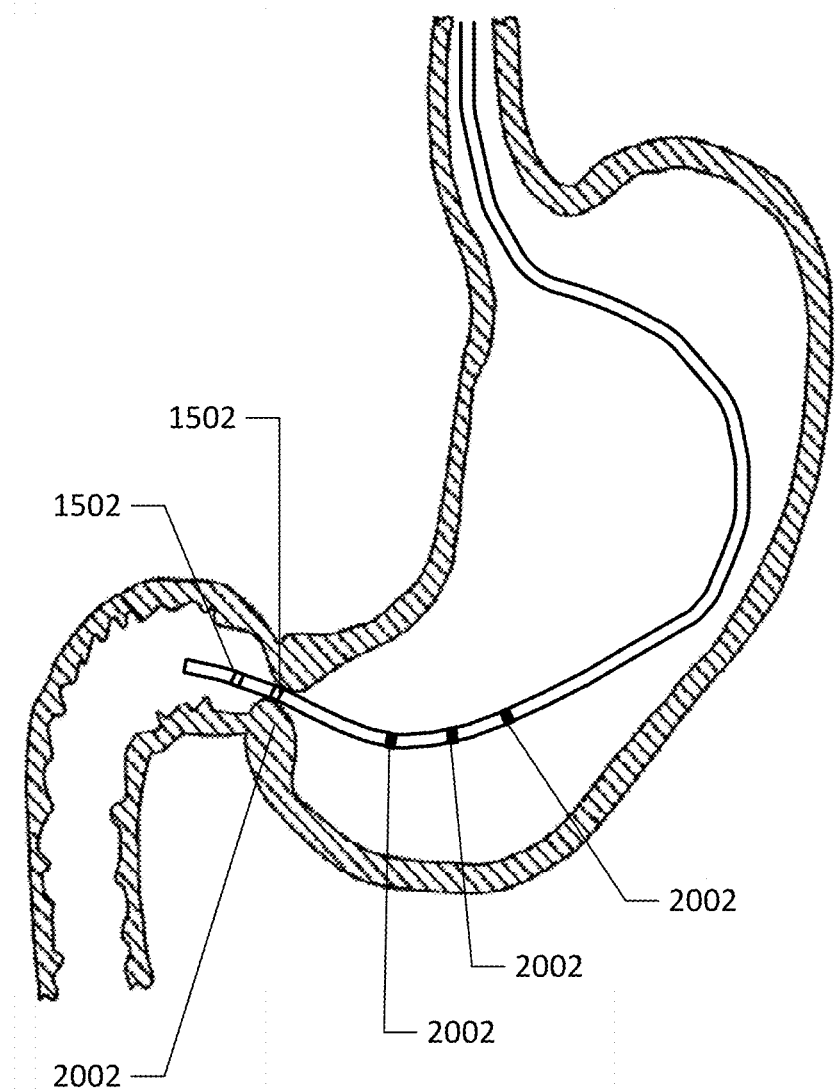
FIG. 20 shows an embodiment of the gastric access device which is designed to locate and pass the pyloric sphincter to allow feeding in the intestines of the patient.

FIG. 20 shows an embodiment of the gastric access device which is designed to locate and pass the pyloric sphincter to allow feeding in the intestines of the patient. Tissue sensing sensors 1502 are shown in the area of pyloric sphincter 2002. The electrodes of the tissue sensing sensors can sense pyloric sphincter similarly to their sensing of the LES. Because these areas of the anatomy are of a smaller diameter than the surrounding tissue, the tissue sensing electrodes can sense tissue contact by sensing an increase in conductivity, or a decrease in resistance between electrodes when the electrodes are in direct contact with the tissue. This contact may happen between any single, or multiple pair of electrodes located circumferentially around the shaft of the device. Since more electrodes around the circumference of the shaft of the device are in contact with tissue in these smaller diameter areas, the tissue contact sensor/electrodes signal can identify these areas by the change in sensor signal as the device passes through this area.

In some embodiments, placement of the device at or past the pyloric sphincter may be identified or confirmed by other methods. These same methods may also be used to place the device in the stomach. For example, pH sensors may determine that the access device is post pyloric or elsewhere. The various sensors disclosed herein may be used to pick up certain signatures, such as pH fluctuations, absolute or relative temperature, peristalsis, impedance/conductivity, etc. ECG sensors may be used to determine a changing ECG signal as the electrodes on the device move through the anatomy. For example, the ECG signal may change as the device passes the patient's mid-line. A bright, or otherwise detectable light may be used on the device which can be detected through the skin to identify that the distal end of the device is in the intestines. Electrodes on the device may be used to sense proximity to each other, via impedance, conductivity, or other methods, which can indicate when the device is in a tight curve, i.e. one part along the length of the device is in relatively close proximity to another part along the length of the device. For example, see the embodiments disclosed in FIGS. 24 and 35. Force or pressure sensors may be used to assess the curvature of the device, to determine whether it is in the curved part of the intestines.

Some embodiments may include direct visualization, such as a camera or fiberoptics to determine and/or confirm placement of the device in the desired anatomy.

Some embodiments may include the ability to differentiate between the esophagus and the trachea by sensing the amount of air/gas suctioned into the device when a vacuum is pulled through the lumen of the device. The ability to suction air/gas into the device will be greater in the trachea than in the esophagus. To avoid the device abutting tissue when a vacuum is pulled, one or more small puffs of air may be introduced through the device before a vacuum is pulled. Alternatively or additionally, openings around the circumference of the shaft of the device may be used.

Some embodiments may measure myoelectrical activity using electrodes. This may be used to help place the device in the desired location.

Any of the embodiments disclosed herein may automatically suction reflux from the esophagus of the patient based on the sensing of reflux, or based on a reflux suctioning schedule.

Sensors incorporated into the gastric access device may collect data continuously, intermittently, on demand, or only at certain times, for example when confirmation of placement is necessary.

Devices disclosed herein include nasogastric tubes with sensors configured to aid in placement of the tube in the stomach, avoiding accidental placement in the trachea or lungs. These sensors may include temperature sensors for sensing fluctuations due to breathing, and impedance/conductivity sensors for sensing the stomach. These sensors may alternatively include temperature, impedance/conductivity and ECG. These sensors may alternatively include any two of temperature, impedance/conductivity, pressure, humidity, pH, ECG. These sensors may alternatively include any three of temperature, impedance/conductivity, pressure, humidity, pH, ECG.

Electrogastrogram (EGG) may also be used to identify the location of the gastric access device in the stomach. EGG sensors may be different than other sensor types, or may use the same electrodes as, for example, the ECG sensors and/or the impedance/conductivity sensors.

In some embodiments, electromagnetic sensors may be used in addition to other sensors for placement.

Although embodiments disclosed herein discuss accessing the GI tract and avoiding the trachea/lungs, the same concepts can be used to locate the trachea/lungs and avoid the GI track.

Figure 21C:
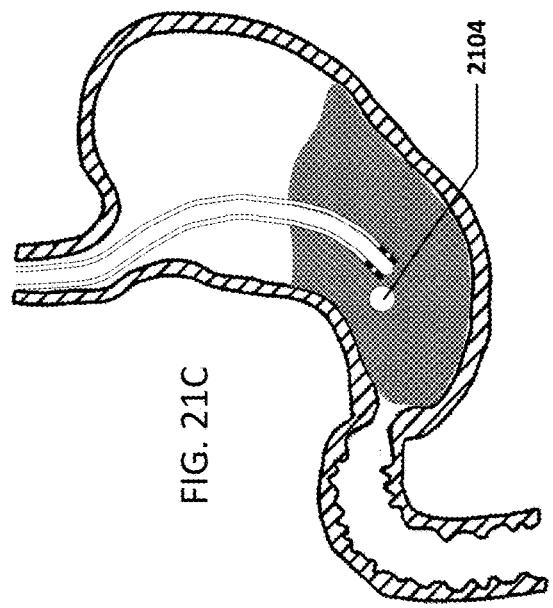
FIGS. 21A-21C show an embodiment which measures/determines intra-abdominal pressure via a feeding tube.
Figure 21A:
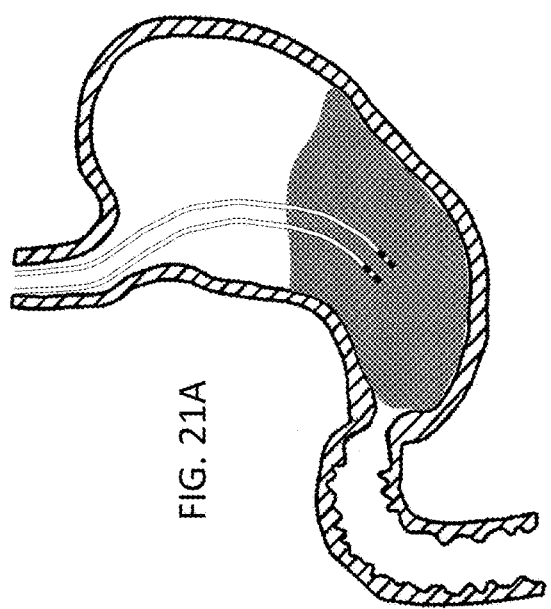
Figure 21B:
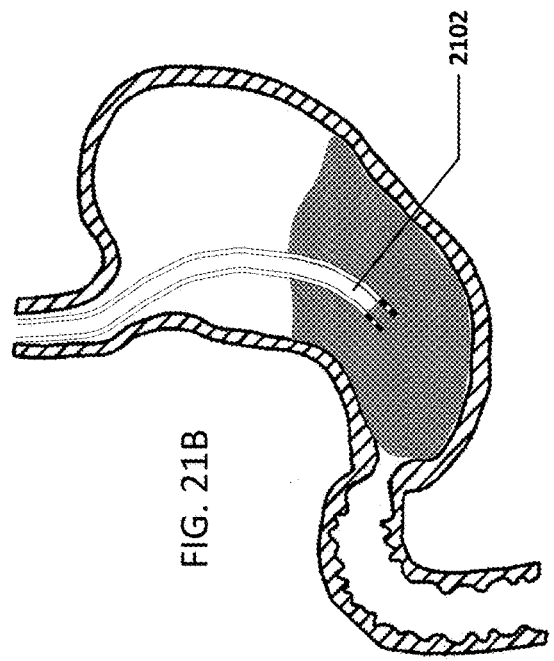

FIGS. 21A-21C show an embodiment which measures/determines intra-abdominal pressure via a feeding tube. FIG. 21A shows the gastric access device, or alternatively, a conventional feeding tube within the stomach. FIG. 21B shows column of air, or other fluid, 2102 which is introduced into a lumen of the tube. As the column of fluid is introduced, the controller measures the pressure within the lumen. The pressure will increase as the fluid fills the lumen. At the point where a portion, or bubble 2104, of the gas/fluid exits the lumen of the gastric access device/feeding tube, the pressure will suddenly drop, indicating that the pressure within the column of fluid has overcome the pressure in the fluid of the stomach. The pressure of the fluid in the stomach is identical to, or correlated with, the intra-abdominal pressure (IAP) of the patient. Therefore, the controller can derive the IAP of the patient by monitoring the pressure of the column of fluid as it is introduced into the lumen of the Gastric access device/feeding tube. The fluid may be air, or another gas, or it may be water or another liquid. The fluid column may be solid or intermittent. The IAP measurement sequence may be performed by the controller on a regular basis. It may be performed before or after feeding. Because the stomach will have more fluid in it after feeding, this may be the preferred time to measure IAP. The IAP measurement may also be done manually, by physically watching the pressure on a gauge, similar to a blood pressure cuff.

In some embodiments, a bubble similar to bubble 2104 may be used to measure pressure fluctuations which can aid in confirming placement of the device in either the esophagus or the trachea.

Figure 22A:
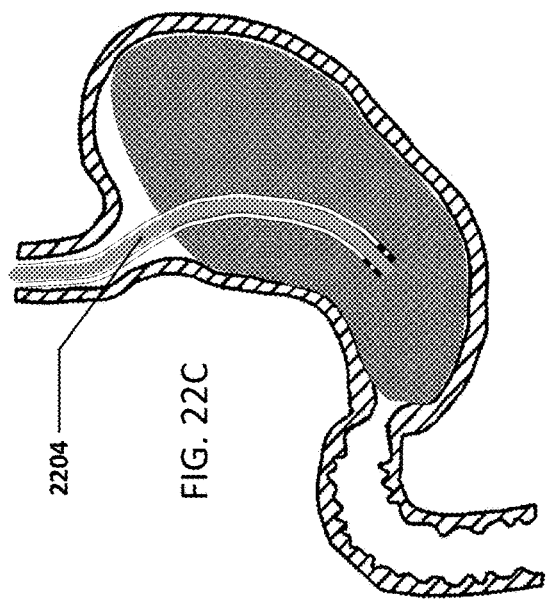
FIGS. 22A-22C show an embodiment which measures/determines TAP (intra-abdominal pressure) via a feeding tube.
Figure 22C:
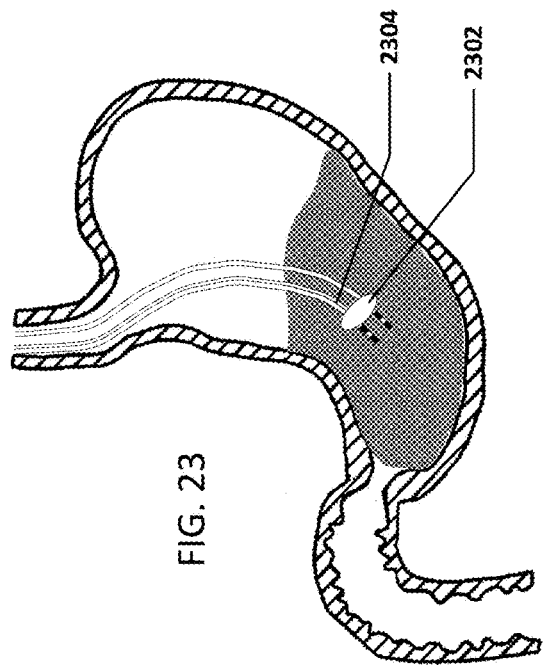
Figure 22B:
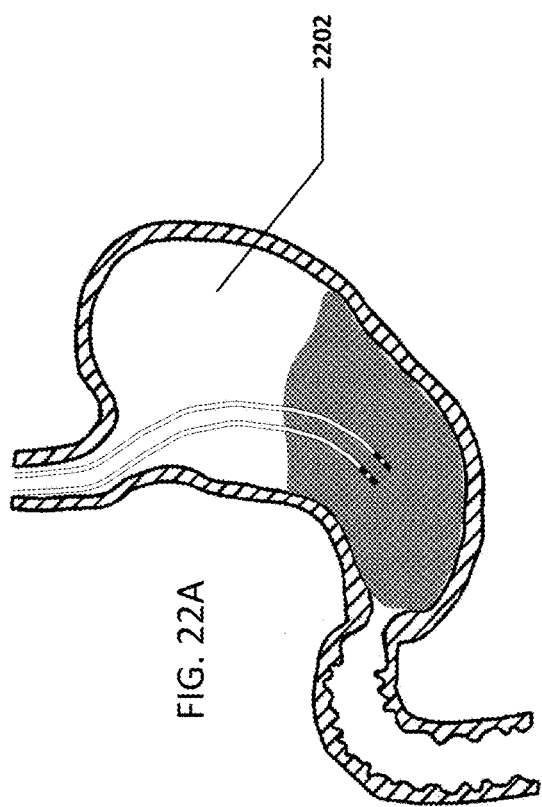

FIGS. 22A-22C show another embodiment which measures/determines IAP via a feeding tube. FIG. 22A shows the Gastric access device, or alternatively, a conventional feeding tube within the stomach. The stomach may contain air/gas 2202. This embodiment involves removing as much of air/gas 2202 as is necessary, by aspiration. Filling the stomach with liquid, or other means, as is shown in FIG. 22B. This air/gas reduction step may or may not be necessary to obtain an accurate IAP measurement. A column of fluid, preferably liquid, 2204 is then introduced into the lumen of the tube, as shown in FIG. 22C. The pressure of the fluid within the stomach, and therefore, an indicator of the IAP, can then be measured by measuring the pressure of the column of fluid. These steps may be performed by the controller, manually, or both.

Figure 23:
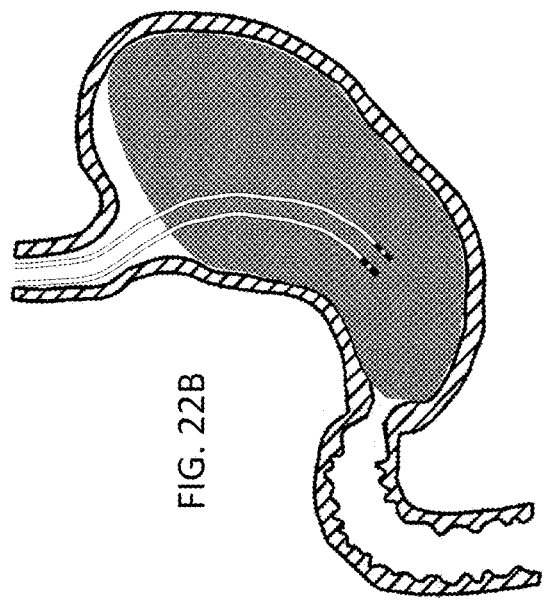
FIG. 23 shows another embodiment of the gastric access device system which can be used to measure/determine TAP.

FIG. 23 shows another embodiment of the GRV measuring system which can be used to measure/determine IAP. This embodiment includes bladder 2302, which can be a balloon, or other bladder sensitive to pressure. The inflation/deflation of the bladder is done via lumen 2304. Lumen 2304 may also be used to monitor the pressure within the balloon/bladder. This pressure is an indicator of IAP. The inflation/deflation and pressure measurements may be performed by the controller, either automatically, or on command. The measurements may be made automatically periodically, and/or automatically before and/or after feeding.

Some embodiments of the Gastric access device may include the ability to test whether the feeding tube is bent or kinked. In one embodiment, the controller may introduce pressurized fluid (gas or liquid) into a lumen of the feeding tube and measure the pressure required for the fluid to flow through the lumen. A baseline pressure may be detected on a non-bent feeding tube to determine the unkinked pressure range. If/when the tube is bent or kinked, the pressure required will increase. The controller can measure and track this pressure over time and can determine the status of the feeding tube based on the absolute pressure, the relative pressure, the change of pressure or the slope of change of pressure over time.

Bending or kinking of the feeding tube may also be measured electronically, for example by measuring the proximity of the electrodes to each other. If the electrodes are closer to each other than their spacing along the feeding tube, then a kink or tight bend is likely present in the tube. This can be done by measuring impedance and/or conductance between electrodes. The pairing of electrodes can be altered by the controller to determine electrode proximity. Alternatively, the same electrode pairing may be used.

Figure 24:
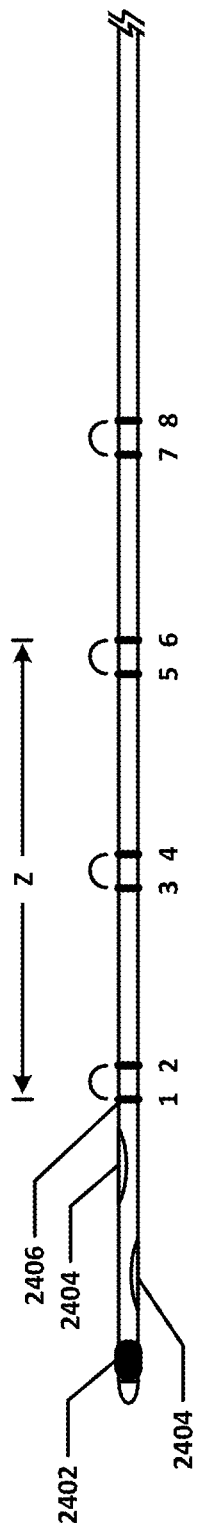
FIGS. 24 and 25 show embodiments of the gastric access device which may be used to detect bending and/or kinking of the device.
Figure 25:
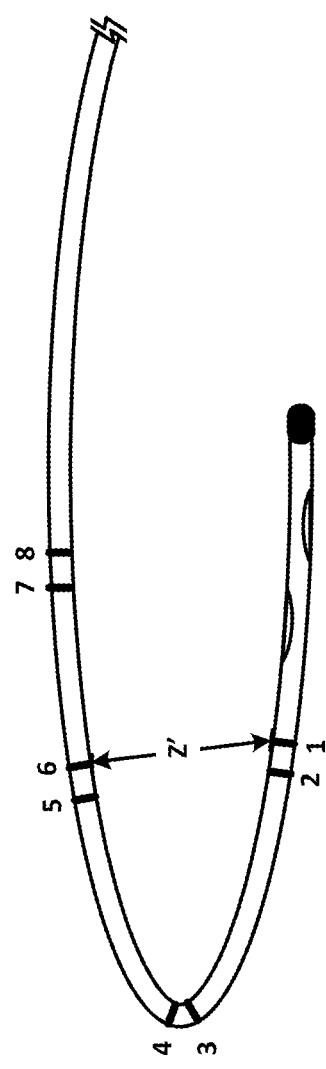

For example, see FIGS. 24 and 25. FIG. 24 shows a gastric access device with pH, or temperature, or other sensor 2402, openings (for feed) 2404, electrodes 2406 which include electrodes 1, 2, 3, 4, 5, 6, 7, and 8. Electrode pairs 1 and 2, 3 and 4, 5 and 6, and 7 and 8 are used as pairs during feeding and placement of the feeding tube to determine conductance/impedance at the electrode pair. However, different electrode pairs may also be used. For example, electrodes 1 and 6 may be used as a pair. The distance between electrode 1 and 6 can be determined via conductance/impedance. When the device is relatively straight, the distance between electrodes 1 and 6 is Z. If the distance becomes shorter, as in Z' shown in FIG. 25, the controller can either sound an alarm/alert, or automatically attempt an unkinking procedure to attempt to unkink the tube. Or, this state may indicate that the device is in the intestines of the patient. Note that the detection of a bend may involve any electrode pair and the pair's relative distances from each other. For example, the conductance/impedance between original electrode pairs may not change in the presence of a bend/kink, but the conductance/impedance between electrode pairs which are further apart may change. The combination may indicate a bend/kink situation.

In some embodiments, the bend/kink of the device may be so extreme that two electrodes on the device come into contact with each other and short out the signal. This information may be used to assess kinking.

In some embodiments, a piezoelectric member may be incorporated into the device to determine the orientation of the device (including whether it is bent/kinked or not) by monitoring the changes of the electrical properties of the piezoelectric member.

In some embodiments, one or more strain gauges may be used to assess kinking/bending of the device.

In some embodiments, one or more accelerometers may be used to determine the orientation of various parts of the device. In some embodiments, a weighted tip may be used to determine orientation of the tip of the device.

In some embodiments, one or more pressure sensors are used for placement of the device. For example, the pressure exerted on the device in the stomach may be higher than that in the esophagus. In embodiments with more than one pressure sensors, a lack of difference between the two pressure readings may indicate that one pressure sensor is in the stomach, while one is in the esophagus. Two similar pressure readings may indicate that the device is kinked in the esophagus.

In some embodiments, a conductive fluid injection may be used to assess bending/kinking of the device. Following placement, conductive fluid may be injected into the patient's mouth. In situations where the device is not bent back upon itself in the anatomy, the electrodes will read increased conductivity signals by electrodes more proximal first, and then progressively more distal. Where the device is bent back upon itself, the distal electrodes may signal increased conductivity out of order, so before some of the more proximal electrodes. Similarly, a device may use temperature sensors and hot or cold liquid to perform a similar assessment.

Some embodiments incorporate automatic air insufflation to reduce device kinking. The controller automatically injects a stream, or puffs of air through the device as the device is being inserted. This air or gas serves to stiffen the device and prevent kinking during insertion. This process may automatically occur during the entire insertion process, or only once resistance is perceived, or once the device is a set distance within the patient.

In some embodiments pressurized air or fluid may be used within a lumen of the device to stiffen it as an alternative to, or in addition to using a stylet.

In some embodiments, the device may be vibrated or rotated automatically during insertion to prevent kinking.

In some embodiments, the distal tip may have a corkscrew shape and may be rotated during insertion.

Some embodiments may include a balloon, or other expandable member, to prevent accidental withdrawal of the device once it is placed. The gastric access device may have a balloon that is inflated against the esophagogastric junction following insertion into the stomach to prevent curling back into the esophagus or inadvertent withdrawal.

Any of the embodiments which include the ability to determine bending/kinking of the device may also be used to assess the shape of the device within the anatomy. In other words, these embodiments may be used for generally device shape modeling, in addition to bend/kink detection.

Figure 26:
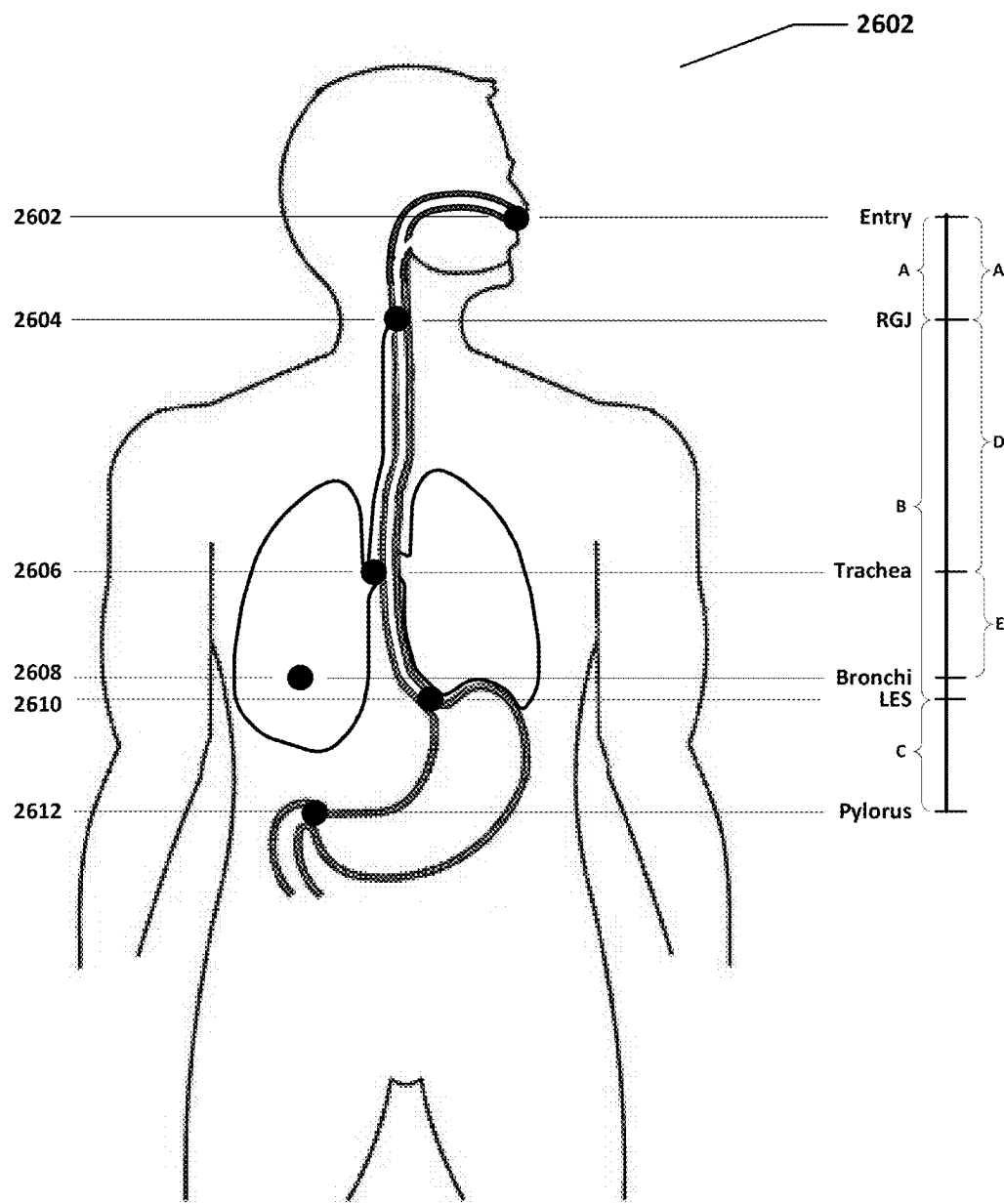
FIG. 26 shows some of the anatomical landmarks that may be used in placing the gastric access device.

FIG. 26 shows some of the anatomical landmarks that may be used in placing the gastric access device. Entry 2602 may be the nostrils or lips of the patient. The Respiratory-Gastric Junction (RGJ) 2604 is the junction of the trachea and the esophagus. The Lower Esophageal Sphincter (LES) 2610 is at the lower end of the esophagus before the junction with the stomach. The pylorus 2612 is at the transition between the stomach and the intestines. Trachea 2606 marks the junction of the trachea and the branching of the bronchi of the lung. Bronchi 2608 marks the estimated maximum depth of incorrect feeding tube insertion. Shown below are some estimated length ranges for infants and adults for the various lengths:

| FIG. 26 Label | Description | Length (cm) Infant | Length (cm) Adult |
|---|---|---|---|
| A | Entry to RGJ | 6 | 18 |
| B | RGJ to LES | 9 | 25 |
| C | LES to pylorus | 2 | 25 |
| D | RGJ to trachea | 5 | 13 |
| E | Trachea to bronchi | 5 | 13 |

Based on these lengths, the gastric access device can be designed to have the correct type of sensors in the appropriate anatomy during placement, and during ongoing use.

FIG. 27 shows a device similar to that shown in FIG. 13. In this embodiment, temperature sensors, such as thermocouples, 1110 may use the same electrodes as impedance/conductivity electrodes 1108. ECG and/or other signals may also be obtained from the same electrodes. FIG. 13 shows an embodiment of an example of one embodiment of the gastric access device, however, the location and spacing and number of sensors/electrodes may vary. Each electrode may utilize the same, or different leads for the different functions performed by the electrode.

FIG. 28A shows the gastric access device shown in FIG. 27 within a scale which shows the approximate length of different sections of the anatomy. The dimensions vary widely by age and individual, and may be narrower or wider than this scale, but this diagram provides a visual scale to both the anatomy and the gastric access device.

FIG. 28B shows an example of placement of the gastric access device within a child. In this example, there are five impedance sensors (Z1 to Z5) and two temperature sensors (T1 and T2) at different device positions/depths of insertion to yield real-time mapping of the device location. Electrode pairs Z3 and Z5 also include a thermocouple bonded to one of the electrodes of each pair of electrodes Z3 and Z5, to measure temperature. The sensed measurements are relayed to the controller, where they are processed by the controller to classify the anatomical location of the device. The device also includes an internal sensor in the feed/medication lumen, which allows direct sampling of the enteral formula being introduced. The anticipated placement of the gastric access device for feeding will be with Z1-Z3 residing within the stomach and Z4 residing 1-4 cm proximal to the lower esophageal sphincter (LES) and Z5 more proximal than Z4 within the esophagus. For placement guidance and confirmation, the controller provides the operator with continuous visual feedback regarding the location of the distal portion of the device.

In some embodiments, it is desirable to have one temperature sensor as close to the distal tip of the device as possible, without being so close to the distal tip that the temperature sensor is generally up against tissue during advancement. This distal-most temperature sensor will aid in placement of the device. As the device is advanced, the distal-most temperature sensor will sense temperature fluctuations, or a lower temperature, associated with breathing ambient air while the sensor is above the RGJ. As the device is advanced further, the temperature fluctuations should flatten out, or the average temperature will increase, if the device is advanced into the esophagus. If, however, the device is advanced into the trachea, which is undesirable, the distal-most temperature sensor will continue to sense temperature fluctuations and/or a lower temperature than body temperature as it is advanced into the trachea. This undesirable advancement will trigger the controller of the system to warn the user and instruct the user to retract the device.

In some instances, the gastric access device may undesirably be in the trachea, but the distal-most temperature sensor may be up against tissue and therefore not sensing temperature fluctuations or a temperature lower than body temperature. The second, more proximal temperature sensor is placed so that it will sense temperature fluctuations, or a temperature lower than body temperature, if the device is misplaced in the trachea. It is desirable that the more proximal temperature sensor be placed along the length of the device such that it has advanced past the RGJ before the distal end of the device passes excessively into the bronchi.

Two temperature sensors are shown here, but fewer or more may be along the device. In some embodiments, each electrode on the device can sense impedance/conductivity, temperature, ECG and in some cases other parameters. The function of the different electrodes may be controlled by the controller. Sensed parameters may alternate throughout placement and use, or sensed parameters may be linked to the size of the patient, or length of the anatomy.

For example, a gastric access device may include 10 pairs of electrodes. The patient may be a tall adult. Based on the patient's height, or other measurement of the patient, the electrodes along the device may be assigned appropriate functions so that there is at least a distal-most temperature sensor, and a proximal temperature sensor, that will allow the device to sense temperature fluctuations and/or average temperatures in the trachea or esophagus, while the device is being introduced into the patient. In some embodiments, the proximal temperature sensor is located so that it is past the RGJ before the distal-most temperature sensor has advanced too far into the bronchi. In some embodiments, the distal-most temperature sensor is proximal to the distal-most electrode pair. In some embodiments, the distal-most temperature sensor is incorporated into the distal-most electrode pair.

Additional electrodes may be proximal to the most proximally used electrode. These electrodes may be useful in taller or larger patients, but not in shorter or smaller patients. In this way, the same device may be used with patients of different sizes and anatomies.

Temperature, impedance/conductance, ECG, pH and other sensors disclosed here, may also be used along the length of the device to sense any type of placement, including post pyloric placement. For example, the device may have electrodes along a significant portion of its length, allowing the controller to receive sensor signals from all parts of the anatomy in which the device is located as it is advanced or after it is advanced. The controller may create a temperature map, an impedance/conductivity map, an ECG may, a pH map, a combination parameter map, etc., the signature of which can be analyzed to determine the likely location of each electrode within the anatomy. This will allow the user to know where the tip of the catheter is, the openings for feed, etc.

Figure 29A:
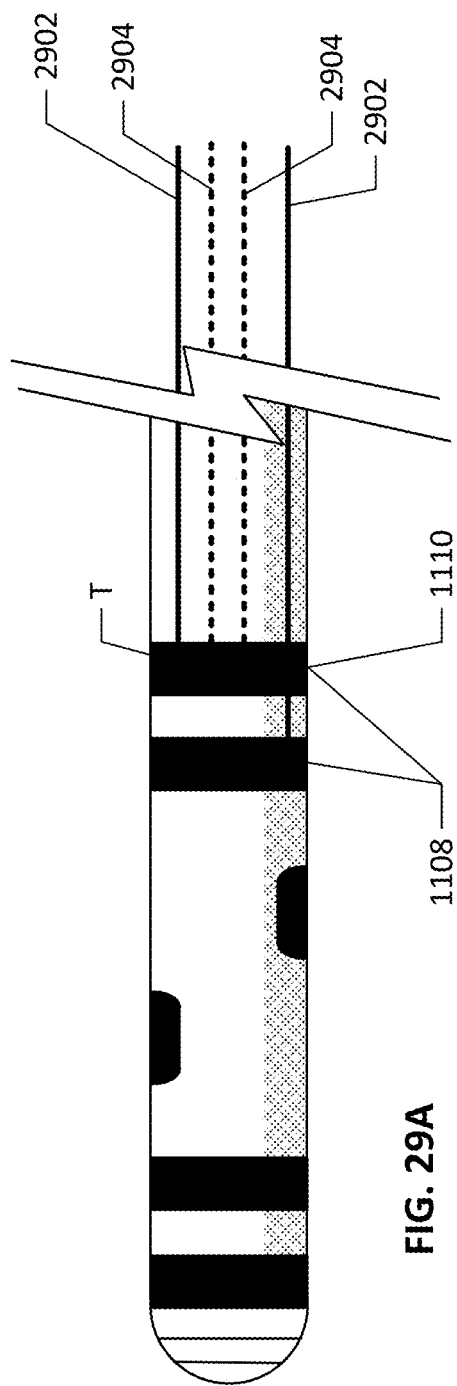
FIGS. 29A and 29B show some detail relating to embodiments which use one electrode for more than one sensor.
Figure 29B:
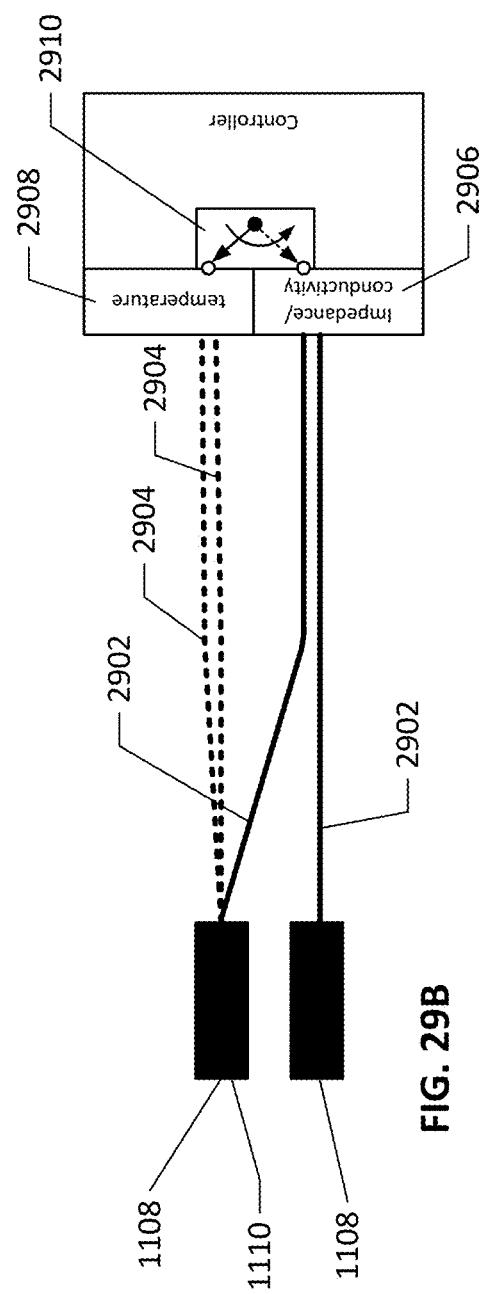

FIGS. 29A and 29B show some detail relating to embodiments which use one electrode for more than one sensor. These figures show an arrangement where a pair of electrodes can both sense impedance or conductance and temperature. Sharing electrodes in this manner saves on costs as well as space, allowing the device to be smaller. Shown are impedance/conductance electrodes 1108, as well as temperature sensor 1110, which in these embodiments, is one of the impedance/conductance electrodes, which are essentially conductive (i.e. metal) bands. This can be accomplished by connecting the impedance/conductance electrodes 1108 to the controller via leads 2902, and connecting the thermocouple of the temperature sensor to the controller via leads 2904. These figures show separate pairs of leads for the different sensors, however it is envisioned that leads may be shared between or among sensors in some embodiments.

The leads generally run along the length of the device as is shown in FIG. 29A. For illustration purposes, FIG. 29B shows an electrical diagram representing these connections, as well as some of the related functions of the controller. Leads 2902 connect the metal bands, or electrodes, to the impedance/conductivity logic area 2906 of the controller. Leads 2904 connect the metal bands, or electrodes, to the temperature logic area 2908 of the controller. These two logic areas are connected to switch 2910 which allows the controller to switch between measuring conductivity/impedance or temperature using the same electrode or electrodes.

Switch 2910 may connect other logic/sensing areas, such as ECG, pH, etc., which may be use overlapping electrodes, similar to temperature and conductivity/impedance do here. In the case of pH sensing, a reference material would be incorporated into the system to determine pH using the electrodes. ECG and pH sensors may use the same leads as impedance/conductivity sensors.

In some embodiments, no physical or logical switch is necessary, the functions of the various leads/electrodes are driven by logic within the controller. Sensing two different parameters with the same electrodes may even overlap in time, for example, the controller may sense both temperature and impedance from the same electrodes at the same time. The controller may sense temperature, impedance and ECG at essentially the same time, if sampling rates allow. For example, sampling rates may be greater than 5 samples/second. Or for example, sampling rates may be greater than 10 samples/second. Or for example, sampling rates may be greater than 20 samples/second. Or for example, sampling rates may be greater than 100 samples/second.

Another advantage of using a 360 degree, or substantially 360 degree conductive band for these types of sensors is the following:

Each sensor impedance/conductivity sensor (which is generally made up of two electrode rings, but may be made up of one, two, or more electrode rings) seeks to measure the path of minimum impedance, or maximum conductivity, between the two rings. This means that the impedance/conductivity sensor is simultaneously sensing 360 degrees around the circumference of the rings. If, for example, the two rings of an impedance/conductivity sensor are up against the gastric wall, the gastric wall tissue will only be contacting one side of the feeding tube and therefor one side of the electrode rings. The sensor will sense the high conductivity/low impedance of this contact, even though a large portion of the circumference of the rings may not be in contact with a high conductivity/low impedance environment. In other words, the impedance/conductivity sensor using the 360 degree rings, is essentially a spot sensor.

In contrast, each temperature sensor may be made up of a thermocouple bonded to a 360 degree electrode or conductive ring. Due to this bond, the thermocouple is essentially sensing the average temperature around the circumference of the ring. In the situation where the feeding tube, and thus the temperature sensor is pressed up against tissue, the temperature sensor will sense an average temperature of the tissue as well as the environment surrounding the rest of the circumference of the ring. This allows the temperatures sensors to sense breathing in the respiratory system even when the feeding tube is up against the wall of the respiratory system, avoiding false negatives. In other words, the temperature sensor using the 360 degree ring is essentially an environmental average sensor.

By using the same electrode for both sensor types, the system can sense both tissue contact (by switching to conductivity/impedance sensing) and temperature environment (by switching to temperature sensing). The controller may switch back and forth between the two depending on the current need and/or location of any particular sensor.

The controller may determine impedance by measuring the voltage drop (amplitude of the cyclic voltage signal) across an electrode pair when a constant-amplitude AC current is applied. For example, the AC current may be 30 kHz, 100 µA peak-to-peak. Temperature measurements may be obtained by using Copper/Constantan thermocouples (Type T) that are thermally bonded to one electrode ring. This design solution provides 360 degree sensing to facilitate acquisition of true impedance and temperature measurements even with intermittent tissue contact or other confounding factors. The sensor positions are designed to accurately classify the anatomical location of the device based on each sensor's measurement of the local environment. The gastric access device can be different lengths to allow optimal sensor spacing based on the clinical nose-ear-mid-umbilicus (NEMU) method commonly used for determining insertion length to ensure final optimal positioning of the sensors within the patient's upper gastrointestinal (GI) Impedance and temperature data may be delivered to the controller in real-time via a secondary non-fluid-contacting lumen. The sensor data may be analyzed by the controller for two different functions: placement (during the device insertion, or for periodic monitoring of position) and gastric status (for determining GRV gastric emptying etc. during feeding).

The placement function may use a simultaneous two-part analysis to classify device location: (1) a time-series temperature pattern recognition function and (2) an impedance threshold classifier (ITC) for identifying device tip placement within the esophagus, stomach, or respiratory system or elsewhere.

The temperature pattern recognition function may assess temperature data from sensors T1 and T2 at a rate of around 5 Hz to detect device misplacement into the airway through the identification and classification of consecutive local maximum and minimums (LMMs). Once the temperature pattern recognition function recognizes a pattern in the LMMs representative of two respiration cycles (typically occurs within 2-4 s in infants, longer in adults), positive determination of airway misplacement may be determined.

Simultaneous to, or interspersed with, temperature analysis, the placement function continuously or intermittently assesses impedance measurements along the device. Impedance measurements in the stomach are generally significantly lower than in the esophagus. In some embodiments, a single threshold of 350Ω is sufficient to differentiate between the stomach and esophagus. In some embodiments, a threshold classifier that defines location is based on the impedance measurements of at least two of three distal sensors. This provides a robust approach to ensure proper placement even in the presence of confounding factors including intermittent tissue contact or air bubbles within the stomach.

| Placement location | Temp function rule | | Impedance function rule |
|---|---|---|---|
| Esophagus (Orange display) | No cyclic fluctuations in LMM of T1 or T2 | AND | 2 of 3 distal impedance sensors (Z1-Z3) measure >350 Ω |
| Stomach (Green display) | No cyclic fluctuations in LMM of T1 or T2 | AND | 2 of 3 distal impedance sensors (Z1-Z3) measure <350 Ω |
| Respiratory system (Red display) | Cyclic fluctuations in LMM of T1 or T2 | | N/A |

Note that a cut off of 350Ω is shown here, however the cut off may be within a range of about 350Ω-400Ω. Alternatively, the cut off may be within a range of about 350Ω-450Ω Alternatively, the cut off may be within a range of about 350Ω-500Ω. Alternatively, the cut off may be within a range of about 350Ω-650Ω. Alternatively, the cut off may be within a range of about 300Ω-400Ω.

The gastric status function calculates the patient's real-time stomach content composition based on: (1) the impedance measurement of the patient's empty stomach prior to any feeding (the measurement may be taken with one or more of the most distal electrode pairs), (2) the impedance measurement of the formula being delivered (sensed using the internal sensor within the device lumen), (3) the real-time average impedance value within the stomach (sensed using one or more of the more distal electrode pairs), and (4) the selection of the appropriate calibration curve from a library. Shifts in stomach content composition pattern characteristics may be evaluated over 4-, 8-, 12- and 24-hr windows using both time-series and latent variable trend analysis to provide automatic feedback on gastric status. Different status categories may include: 1) feeding is optimized, 2) low-risk of feeding intolerance (advance feedings if caloric goal has not been achieved) and 3) high risk of feeding intolerance (reduce feedings if there are clinical signs of feeding intolerance).

The placement and gastric status function outputs are visually displayed on the controller to provide real-time feedback to clinical staff. The reusable pole-mounted controller includes a user-interface display, and may be powered by a standard outlet and may contain an internal battery capable of supporting 12 or more hours of continuous function. For initial device placement, the operator may receive the following notifications: (1) ORANGE ESOPHAGUS: "Distal tip of the device is in the esophagus. Continue advancing", (2) RED LUNGS: "Distal tip of the device has entered the respiratory tract. RETRACT", (3) GREEN STOMACH: "Distal tip of the device is properly placed in the stomach". Once correct gastric placement has been achieved, the gastric status function of the controller will continuously monitor for changes in digestion and provide automatic feedback on how best to optimize feeding: 1) feeding is optimized, 2) feeding intolerance risk is low (advance feeding), and 3) feeding intolerance risk is high (reduce feeding).

In some instances, a user may introduce medication through the feeding lumen of a feeding tube. This medication may take the form of crushed pills or other bulky substances. The feeding lumen of the feeding tube can often become blocked because of added medications, which can be difficult to unblock. To prevent large particles of medication from entering a feeding tube, an anti-clogging mechanism may be used in conjunction with the gastric access device, or any feeding tube.

Figure 30A:
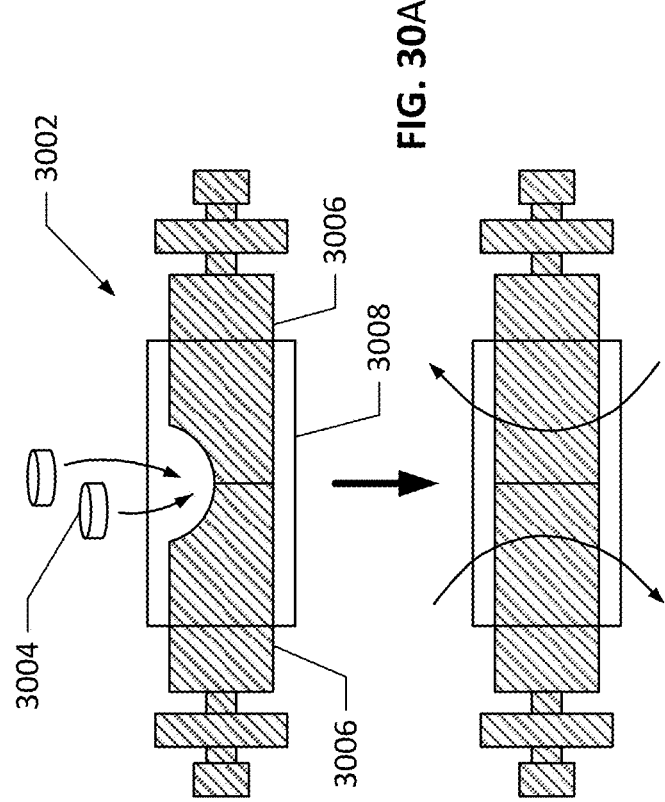
FIGS. 30A-E show embodiments of anti-clogging mechanisms.

FIG. 30A shows a medication introducer accessory which can be used with any feeding tube. The medication crusher 3002 includes rotating segments 3006 and sheath 3008.

Medication 3004, such as pills, are introduced into a cavity within rotating segments 3006. Teeth, or another grinding mechanism (not shown), are in communication with the cavity. The sheath may be rotated after the pills are in the cavity to prevent the medication from leaving the accessory. The two rotating segments are then rotated with respect to each other to grind the medication so that the particles are small enough to enter the feeding lumen of the feeding tube without clogging the feeding tube. The grinding mechanism may be similar to that of a pepper grinder. In some embodiments, the grinding action may be a ratcheted action, where the medication is only ground when rotating the segments in one direction, but not when rotating them in the opposite direction, again, similar to a pepper grinder.

Figure 30B:
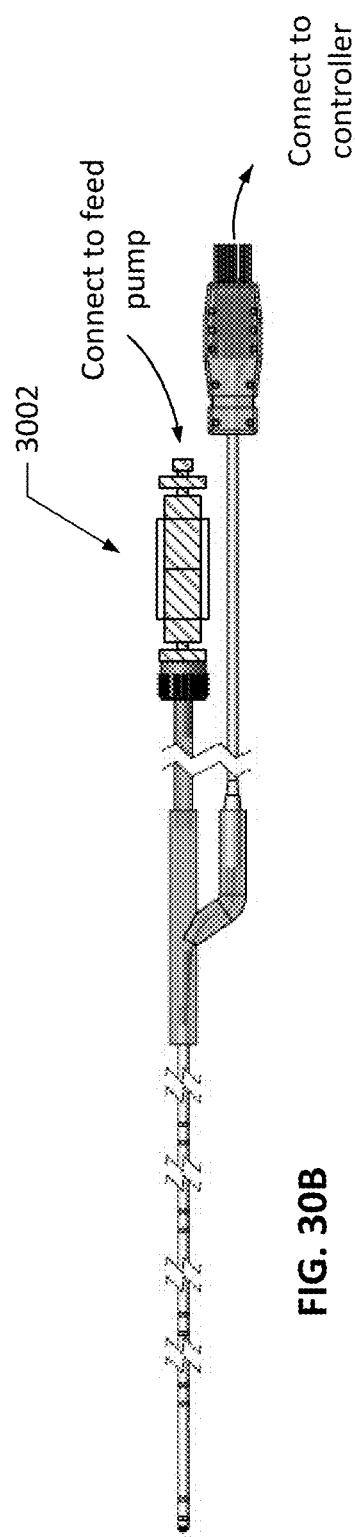

Crusher accessory 3002 is connected to the feeding tube or gastric access device as shown in FIG. 30B.

Figure 30C:
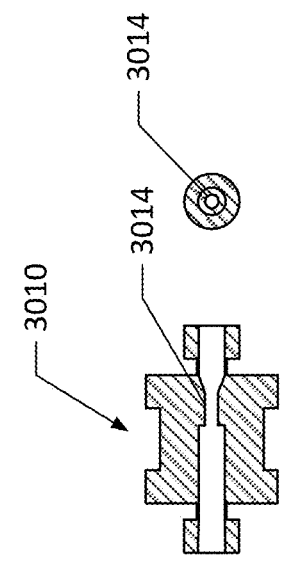
Figure 30D:
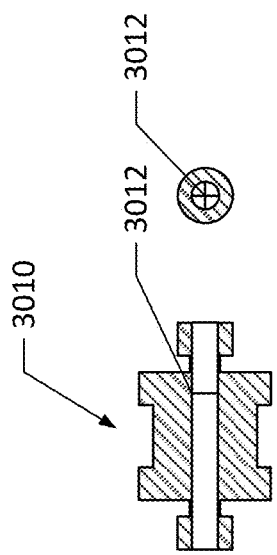

FIG. 30C shows another embodiment of an anti-clogging mechanism. This introducer accessory 3010 include a limiter, filter or cutter to prevent large chunks of medication from entering the feeding tube. The filter may be in the form of a wire mesh, or cross 3012, as shown in FIG. 30C. The wire filter may be made from 0.003" diameter stainless steel wire or similar. FIG. 30D shows an embodiment of the introducer accessory 3010 which includes narrowing 3014. The narrowing essentially prevents any chunks of medication from entering the feeding tube at all. If any chunks of medication in the feed are larger than the diameter of narrowing 3014. They will not be introduced into the feeding tube. Narrowing 3014 has a smaller diameter than that of the feeding lumen of the feeding tube.

Other embodiments of an anti-clogging mechanism might include sharp blades to cut larger chunks of medication which are forced through the opening.

Figure 30E:
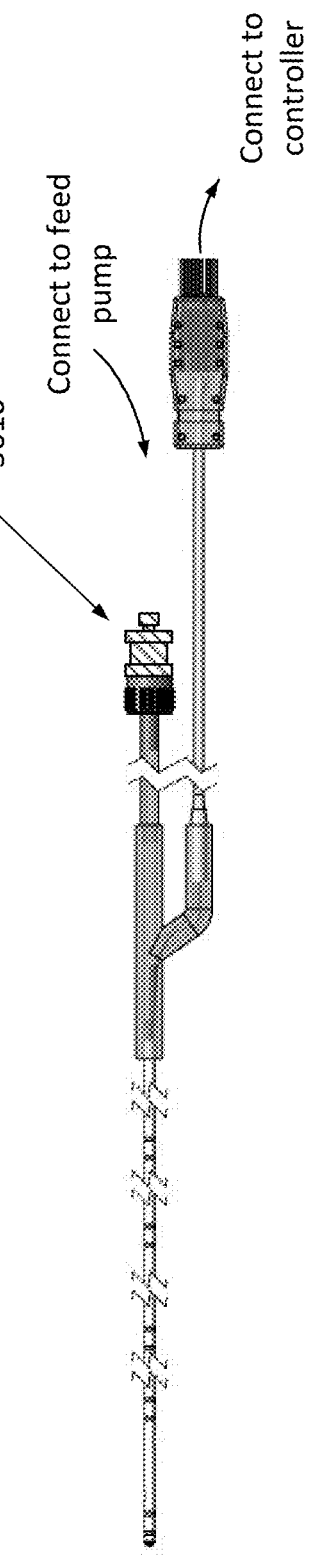

Introducer accessory 3010 is connected to the feeding tube or gastric access device as shown in FIG. 30E.

The controller of any of the embodiments disclosed herein may include the ability to analyze and/or display contextual data. For example, reflux history may be collected, analyzed, displayed and used to automatically control the controller. For example, a patient with a higher incident of reflux may require more frequent or continual suction events. The controller may take into consideration the extent and/or frequency of reflux events to determine the reflux suction schedule and/or suction level. The contextual reflux information may also determine whether or not the expandable member is expanded during suction events. Contextual feeding, GRV, placement information may also be used in this manner.

In some embodiments, the gastric access device may use electrodes along the device to sense passive electrical signals generated in the walls of the stomach. These signals can be used to assess gastric health, such as peristalsis.

GRV/gastric emptying may be tracked by the system over time by introducing an additive element with a measurable parameter where the parameter is at a level that is different than that of the stomach contents. The parameter level is sensed by sensors on the feeding tube and changes analyzed over time to determine GRV/gastric emptying. For example, a fluid with a conductivity that is lower than that of stomach contents (such as feed) may be introduced into the stomach, either as a bolus, multiple boluses, or continually or over time. The sensors along the gastric access device may be conductivity/impedance sensors and can sense the conductivity/impedance along the device over time to determine GRV/gastric emptying. Other parameters may also be used, such as temperature, pH, chemical content, optical parameters, etc.

In some embodiments, a sensor is also present inside the additive element delivery lumen of the device, which may be the feeding lumen or may be a separate lumen. This sensor(s) may measure the parameter of the additive before it is added to the stomach so that the parameter level of the additive is known before it is introduced into the stomach. This allows the controller to determine GRV/gastric emptying more accurately. For example, in the conductivity/impedance example above, a pair of electrodes may be present inside the feed lumen of the device and measure the conductivity/impedance of the additive (which may be feed) just before it enters the stomach. The electrodes may be flush with the inner surface of the feeding lumen. This measurement can be factored into the GRV/gastric emptying analysis so that the change in the parameter due to the stomach contents can be accurately determined. This inner lumen sensor may be considered a "calibration sensor".

In some embodiments, the controller switches to feed mode, to monitor GRV, after it senses feed or liquid within the feeding lumen of the device.

When the gastric access device is in feeding mode, it may place itself in different states, for example, feeding optimized, low-risk of feeding intolerance (advance feedings if caloric goal has not been achieved) and 3) high risk of feeding intolerance (reduce feedings if there are clinical signs of intolerance).n some embodiments, the gastric access device may be able to measure the % concentration of food vs. gastric fluid in the stomach, based on measuring a parameter of the additive (in this case food) over time. These embodiments may include calibration sensors.

In some embodiments, digestive health may be assessed by providing a bolus of an additive element and tracking the GRV/gastric emptying immediately following the bolus. The GRV/gastric emptying profile can be used to determine a particular patient's health by comparing the profile to those of healthy and unhealthy individuals and/or populations. For example, an additive bolus with a high level of glucose may be used and the GRV/gastric emptying monitored after the bolus. Other indicators may also be monitored, such as blood glucose level, etc.

Any of the features in any of the embodiments disclosed herein may be combined with any of the other features and may be used in any of the embodiments disclosed herein.

Example of Data Processing System

Figure 31:
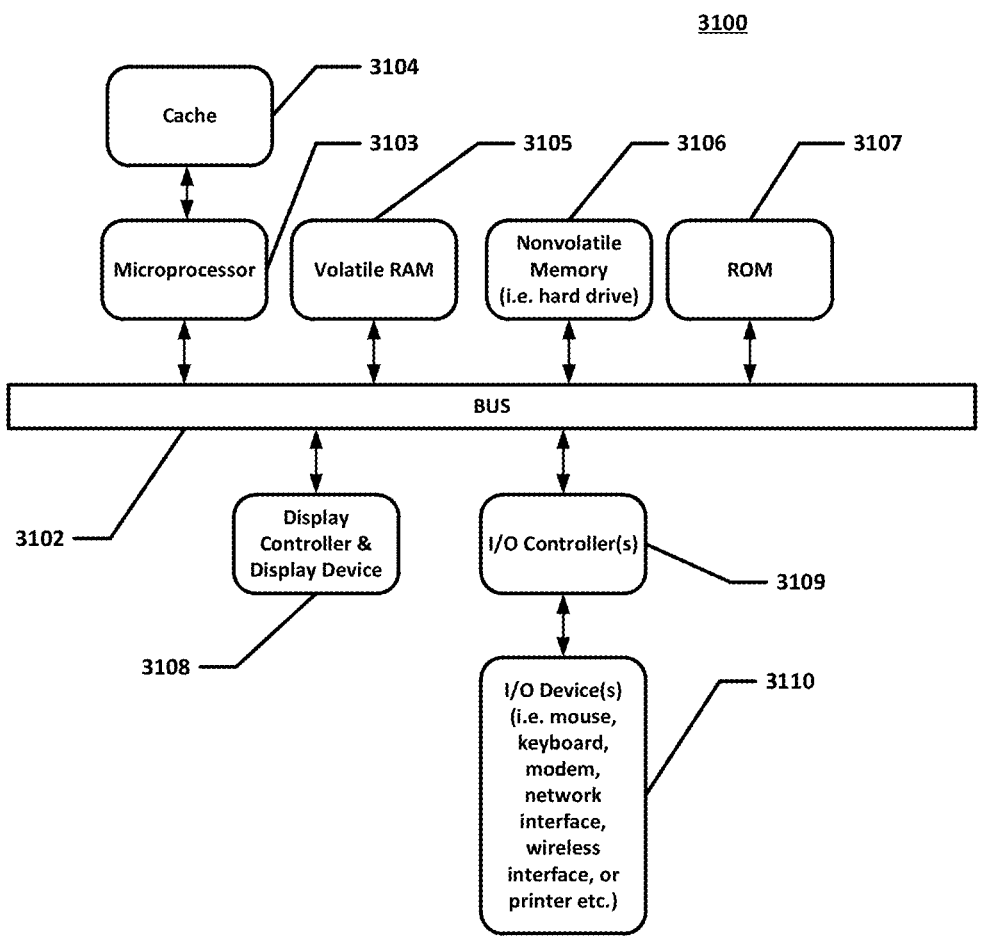
FIG. 31 is a block diagram of a data processing system, which may be used with any embodiments of the invention.

FIG. 31 is a block diagram of a data processing system, which may be used with any embodiment of the invention. For example, the system 3100 may be used as part of a controller/monitor disclosed herein. Note that while FIG. 31 illustrates various components of a computer system, it is not intended to represent any particular architecture or manner of interconnecting the components; as such details are not germane to the present invention. It will also be appreciated that network computers, handheld computers, mobile devices, tablets, cell phones and other data processing systems which have fewer components or perhaps more components may also be used with the present invention.

As shown in FIG. 31, the computer system 3100, which is a form of a data processing system, includes a bus or interconnect 3102 which is coupled to one or more microprocessors 3103 and a ROM 3107, a volatile RAM 3105, and a non-volatile memory 3106. The microprocessor 3103 is coupled to cache memory 3104. The bus 3102 interconnects these various components together and also interconnects these components 3103, 3107, 3105, and 3106 to a display controller and display device 3108, as well as to input/output (I/O) devices 3110, which may be mice, keyboards, modems, network interfaces, printers, and other devices which are well-known in the art.

Typically, the input/output devices 3110 are coupled to the system through input/output controllers 3109. The volatile RAM 3105 is typically implemented as dynamic RAM (DRAM) which requires power continuously in order to refresh or maintain the data in the memory. The non-volatile memory 3106 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 31 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 3102 may include one or more buses connected to each other through various bridges, controllers, and/or adapters, as is well-known in the art. In one embodiment, the I/O controller 3109 includes a USB (Universal Serial Bus) adapter for controlling USB peripherals. Alternatively, I/O controller 3109 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

All embodiments disclosed herein may incorporate features from other embodiments disclosed herein.

What is claimed is:

1. A feeding tube system, comprising:
   a gastric access device having a length;
   a controller in communication with the gastric access device;
   one or more impedance or conductivity sensors positioned along the length with at least one impedance or conductivity sensor positioned at or in proximity to a distal end of the length, wherein each of the one or more impedance or conductivity sensors is in communication with the controller which is configured to receive a first signal indicative of an impedance or conductivity level of a fluid within a subject and in contact with the one or more impedance or conductivity sensors;
   one or more temperature sensors positioned along the length and in communication with the controller which is further configured to indicate a pause based on the impedance or conductivity level while receiving a second signal indicative of a temperature level of an environment within the subject that is associated with respiration and in contact with the one or more temperature sensors; and
   wherein the controller is configured to receive the first signal and detect for a presence of fluctuations in the second signal and determine whether a placement of the gastric access device is within a stomach of the subject based on both the first signal and the second signal.

2. The system of claim 1 wherein the at least one impedance or conductivity sensor and at least one of the one or more temperature sensors comprise a common electrode.

3. The system of claim 2 wherein the common electrode encircles a circumference of the gastric access device.

4. The system of claim 1 wherein the one or more temperature sensors comprise at least one sensor positioned at or in proximity to the distal end of the length.

5. The system of claim 4 further comprising at least a second temperature sensor positioned along the length and proximal to the at least one sensor.

6. The system of claim 1 wherein the controller is further configured to receive the second signal and detect for fluctuations in the temperature level due to the respiration.

7. The system of claim 1 wherein the controller is further configured to receive the second signal and determine an average of the temperature level due to the respiration.

8. The system of claim 1 wherein the second signal is indicative of the temperature level of air associated with respiration within the subject.

9. The system of claim 1 wherein at least one of the one or more temperature sensors is configured to sense an ambient temperature external to the subject.

10. The system of claim 9 wherein the controller is further configured to compare the second signal against the ambient temperature.

11. The system of claim 1 wherein the controller is further configured to monitor a gastric status within the stomach.

12. The system of claim 11 wherein the controller is configured to determine a gastric residual volume within the stomach.

13. The system of claim 11 wherein the controller is configured to detect gastric reflux.

14. The system of claim 1 wherein the controller is configured to confirm that the first signal is indicative of the impedance or conductivity level of the fluid within the stomach.

15. The system of claim 14 wherein the controller is configured to confirm placement within the stomach when the first signal indicates a higher conductivity, or a lower impedance, than the impedance or conductivity of the esophageal environment.

16. The system of claim 1 wherein the gastric access device is sized for placement distal to a pylorus of the stomach.

17. The system of claim 1 wherein the impedance or conductivity sensors comprise electrodes, and wherein the controller is further configured to monitor for a prolapse or bending of the length based on a comparison of signals between two of the electrodes.

18. The system of claim 1 wherein the controller is further configured to indicate a pause in advancement of the gastric access device into the subject.

19. The system of claim 18 wherein the controller is further configured to indicate the pause of at least one second.

20. The system of claim 1 further comprising an anti-clogging mechanism positioned in proximity to an opening of the gastric access device.

21. A feeding tube system, comprising:
   a gastric access device having a length;
   a controller in communication with the gastric access device;
   one or more impedance or conductivity sensors positioned along the length with at least one impedance or conductivity sensor positioned at or in proximity to a distal end of the length, wherein each of the one or more impedance or conductivity sensors is in communication with the controller which is configured to receive a first signal indicative of an impedance or conductivity level of an environment within a subject and in contact with the one or more impedance or conductivity sensors;
   one or more temperature sensors positioned along the length and in communication with the controller which is further configured to indicate a pause based on the impedance or conductivity level while receiving a second signal indicative of a temperature level of a region within the subject that is associated with respiration and in contact with the one or more temperature sensors;
   wherein the controller is configured to indicate a pause in advancement of the gastric access device into the subject until the second signal indicates an absence of the temperature level of the region associated with respiration, and wherein the controller is further configured to receive the first signal and detect for a presence of fluctuations in the second signal and determine whether a placement of the gastric access device is within a stomach of the subject based on both the first signal and the second signal.

22. The system of claim 21 wherein the first signal is indicative of the impedance or conductivity level of a fluid within the subject.

23. The system of claim 21 wherein the second signal is indicative of the temperature level of air associated with respiration within the subject.

24. The system of claim 21 wherein the at least one impedance or conductivity sensor and at least one of the one or more temperature sensors comprise a common electrode.

25. The system of claim 24 wherein the common electrode encircles a circumference of the gastric access device.

26. The system of claim 21 wherein the one or more temperature sensors comprise at least one sensor positioned at or in proximity to the distal end of the length.

27. The system of claim 26 further comprising at least a second temperature sensor positioned along the length and proximal to the at least one sensor.

28. The system of claim 21 wherein the controller is further configured to receive the second signal and detect for fluctuations in the temperature level due to the respiration.

29. The system of claim 21 wherein the controller is further configured to receive the second signal and determine an average of the temperature level due to the respiration.

30. The system of claim 21 wherein at least one of the one or more temperature sensors is configured to sense an ambient temperature external to the subject.

31. The system of claim 30 wherein the controller is further configured to compare the second signal against the ambient temperature.

32. The system of claim 21 wherein the controller is further configured to monitor a gastric status within the stomach.

33. The system of claim 32 wherein the controller is configured to determine a gastric residual volume within the stomach.

34. The system of claim 33 wherein the controller is configured to detect gastric reflux.

35. The system of claim 21 wherein the controller is configured to confirm that the first signal is indicative of the impedance or conductivity level of the fluid within the stomach.

36. The system of claim 35 wherein the controller is configured to confirm placement within the stomach when the first signal indicates a higher conductivity, or a lower impedance, than the impedance or conductivity of the esophageal environment.

37. The system of claim 21 wherein the gastric access device is sized for placement distal to a pylorus of the stomach.

38. The system of claim 21 wherein the impedance or conductivity sensors comprise electrodes, and wherein the controller is further configured to monitor for a prolapse or bending of the length based on a comparison of signals between two of the electrodes.

39. The system of claim 21 wherein the controller is further configured to indicate a pause in advancement of the gastric access device into the subject.

40. The system of claim 39 wherein the controller is further configured to indicate the pause of at least one second.

41. The system of claim 21 further comprising an anti-clogging mechanism positioned in proximity to an opening of the gastric access device.

42. A feeding tube system, comprising:
a gastric access device having a length;
a controller in communication with the gastric access device;
one or more impedance or conductivity sensors positioned along the length with at least one impedance or conductivity sensor positioned at or in proximity to a distal end of the length, wherein each of the one or more impedance or conductivity sensors is in communication with the controller which is configured to receive a first signal and confirm that the first signal is indicative of an impedance or conductivity level of a fluid within a subject and in contact with the one or more impedance or conductivity sensors;
one or more temperature sensors positioned along the length and in communication with the controller which is further configured to receive a second signal and confirm that the second signal is indicative of a temperature level of an environment within the subject that is associated with respiration and in contact with the one or more temperature sensors; and
wherein at least one of the one or more impedance or conductivity sensors and at least one of the one or more temperature sensors comprise a common electrode,
wherein the controller is configured to receive the first signal and the second signal and determine whether a placement of the gastric access device is within a stomach of the subject based on both the first signal and the second signal.

43. The system of claim 42 wherein the common electrode encircles a circumference of the gastric access device.

44. A feeding tube system, comprising:
a gastric access device having a length;
a controller in communication with the gastric access device;
one or more impedance or conductivity sensors positioned along the length with at least one impedance or conductivity sensor positioned at or in proximity to a distal end of the length, wherein each of the one or more impedance or conductivity sensors is in communication with the controller which is configured to receive a first signal and confirm that the first signal is indicative of an impedance or conductivity level of an environment within a subject and in contact with the one or more impedance or conductivity sensors;
one or more temperature sensors positioned along the length and in communication with the controller which is further configured to receive a second signal and confirm that the second signal is indicative of a temperature level of a region within the subject that is associated with respiration and in contact with the one or more temperature sensors;
wherein at least one of the one or more impedance or conductivity sensors and at least one of the one or more temperature sensors comprise a common electrode,
wherein the controller is configured to indicate a pause in advancement of the gastric access device into the subject until the second signal indicates an absence of the temperature level of the region associated with respiration, and wherein the controller is further configured to receive the first signal and the second signal and determine whether a placement of the gastric access device is within a stomach of the subject based on both the first signal and the second signal.

45. The system of claim 44 wherein the common electrode encircles a circumference of the gastric access device.

46. A feeding tube system, comprising:
a gastric access device having a length;
a controller in communication with the gastric access device;
one or more impedance or conductivity sensors positioned along the length with at least one impedance or conductivity sensor positioned at or in proximity to a distal end of the length, wherein each of the one or more impedance or conductivity sensors is in communication with the controller which is configured to receive a first signal and confirm that the first signal is indicative of an impedance or conductivity level of a fluid within a subject and in contact with the one or more impedance or conductivity sensors;
one or more temperature sensors positioned along the length and in communication with the controller which is further configured to receive a second signal and confirm that the second signal is indicative of a temperature level of an environment within the subject that is associated with respiration and in contact with the one or more temperature sensors, wherein at least one of the one or more temperature sensors is configured to sense an ambient temperature external to the subject; and
wherein the controller is configured to receive the first signal and the second signal and determine whether a placement of the gastric access device is within a stomach of the subject based on both the first signal and the second signal.

47. The system of claim 46 wherein the controller is further configured to compare the second signal against the ambient temperature.

48. A feeding tube system, comprising:
a gastric access device having a length;
a controller in communication with the gastric access device;
one or more impedance or conductivity sensors positioned along the length with at least one impedance or conductivity sensor positioned at or in proximity to a distal end of the length, wherein each of the one or more impedance or conductivity sensors is in communication with the controller which is configured to receive a first signal and confirm that the first signal is indicative of an impedance or conductivity level of an environment within a subject and in contact with the one or more impedance or conductivity sensors;
one or more temperature sensors positioned along the length and in communication with the controller which is further configured to receive a second signal and confirm that the second signal is indicative of a temperature level of a region within the subject that is associated with respiration and in contact with the one or more temperature sensors, wherein at least one of the one or more temperature sensors is configured to sense an ambient temperature external to the subject;
wherein the controller is configured to indicate a pause in advancement of the gastric access device into the subject until the second signal indicates an absence of the temperature level of the region associated with respiration, and
wherein the controller is further configured to receive the first signal and the second signal and determine whether a placement of the gastric access device is within a stomach of the subject based on both the first signal and the second signal.

49. The system of claim 48 wherein the controller is further configured to compare the second signal against the ambient temperature.

* * * * *